(12) United States Patent
Awale et al.

(10) Patent No.: US 12,486,833 B2
(45) Date of Patent: Dec. 2, 2025

(54) HIGH-GRADE HEAT-OF-COMPRESSION STORAGE SYSTEM, AND METHODS OF USE

(71) Applicant: HIGHVIEW ENTERPRISES LIMITED, London (GB)

(72) Inventors: Fahmi Osman Awale, London (GB); Colm John Cochrane, London (GB); Cian Quinn, London (GB); Oliver James McArdle, London (GB)

(73) Assignee: Highview Enterprises Limited, London (GB)

( * ) Notice: Subject to any disclaimer, the term of this patent is extended or adjusted under 35 U.S.C. 154(b) by 0 days.

(21) Appl. No.: 18/686,016

(22) PCT Filed: Aug. 25, 2022

(86) PCT No.: PCT/GB2022/052190
§ 371 (c)(1),
(2) Date: Feb. 23, 2024

(87) PCT Pub. No.: WO2023/026052
PCT Pub. Date: Mar. 2, 2023

(65) Prior Publication Data
US 2024/0240620 A1  Jul. 18, 2024

(30) Foreign Application Priority Data

Aug. 27, 2021  (GB) ...................................... 2112303

(51) Int. Cl.
F03G 7/06  (2006.01)
(52) U.S. Cl.
CPC ...................................... *F03G 7/06* (2013.01)
(58) Field of Classification Search
CPC ......... F03G 7/06; F01K 25/10; F25J 2235/02; F25J 2240/90; F25J 1/0015; F25J 1/0017;
(Continued)

(56) References Cited

U.S. PATENT DOCUMENTS 9,121,417 B2 * 9/2015 Guidati ..................... F02C 6/16
9,500,185 B2 * 11/2016 Al-Sulaiman ........... F01K 25/08
(Continued)

FOREIGN PATENT DOCUMENTS

CN  105865149 A  7/2018
CN  109579432 B  6/2020
(Continued)

OTHER PUBLICATIONS

International Search Report and Written Opinion received in PCT/GB2022/052190 mailed Mar. 23, 2023.
(Continued)

*Primary Examiner* — Jesse S Bogue
(74) *Attorney, Agent, or Firm* — Meunier Carlin & Curfman LLC

(57) ABSTRACT

The present invention relates to cryogenic energy storage systems for storing using high-grade heat-of-compression. The system includes a liquefaction sub-system (100) and thermal energy storage device (300). The liquefaction sub-system (100) includes a first compressor (102), a first, second and third heat exchanger (104, 116, 112) and second compressor (114). The first and second heat exchangers (104, 116) are configured to transfer the high-grade heat of compression from the first and second compressors (102, 114) respectively to the thermal energy storage device (300). The third heat exchanger (112) is configured to recuperate the low-grade heat of compression from the second compressor (114) back into the second compressor (114) enabling the second compressor (114) to generate high-grade heat of compression. Further systems use compressors (124) and expanders (122). Further systems include power recovery sub-systems (400). The present disclosure also relates to methods of heat-of-compression storage in cryogenic energy storage systems.

25 Claims, 8 Drawing Sheets

(58) Field of Classification Search
CPC ........ F25J 1/0022; F25J 2205/60; F25J 1/004; F25J 1/0045; F25J 1/0202; F25J 1/0242; F25J 2230/04; F25J 2230/30; F25J 1/0251; F25J 1/0012; Y02E 60/16; F17C 9/04

See application file for complete search history.

(56) References Cited

U.S. PATENT DOCUMENTS

| | | | |
|---|---|---|---|
| 10,012,448 B2 * | 7/2018 | Laughlin | ............... F28D 15/00 |
| 10,384,926 B1 * | 8/2019 | Kaufman | ............... F25J 1/0236 |
| 2017/0138674 A1 * | 5/2017 | Pourima | ............... F02C 6/16 |
| 2019/0063685 A1 | 2/2019 | Sinatov | |

FOREIGN PATENT DOCUMENTS

| | | |
|---|---|---|
| CN | 111425270 A | 7/2020 |
| CN | 211903494 U | 11/2020 |
| CN | 212339737 U | 1/2021 |
| CN | 112855292 A | 5/2021 |
| KR | 20160087117 A | 7/2016 |
| KR | 20200088645 A | 7/2020 |
| WO | 2012020233 A2 | 2/2012 |
| WO | 2013034908 A2 | 3/2013 |
| WO | 2015181553 A2 | 12/2015 |
| WO | 2019158921 A1 | 8/2019 |

OTHER PUBLICATIONS

Nikunj Gangar, Sandro Macchietto and Christos N. Markides— Recovery and Utilization of Low-Grade Waste Heat in the Oil Refining Industry Using Heat Engines and Heat Pumps: An International Technoeconomic Comparison, Energies online May 18, 2020.
International Preliminary Report on Patentability received in PCT/GB2022/052190 mailed Feb. 27, 2024.
Combined Search and Examination Report received in GB2112303.9 mailed Feb. 10, 2022.
Search and Examination Report received in GB2112303.9 mailed Aug. 10, 2022.
Invitation to Pay Additional Fees and, Where Applicable, Protest Fee received in PCT/GB2022/052190 mailed Dec. 9, 2022.
Search under Section 17 received in GB2313116.2 mailed Sep. 25, 2023.

* cited by examiner

HIGH-GRADE HEAT-OF-COMPRESSION STORAGE SYSTEM, AND METHODS OF USE

FIELD OF THE INVENTION

The present invention relates to cryogenic energy storage systems and methods for operating the same, and particularly to heat-of-compression storage in the sub-systems thereof.

BACKGROUND

Electricity transmission and distribution networks (or grids) must balance the generation of electricity with the demand from consumers. This is normally achieved by modulating the generation side (supply side) by turning power stations on and off, and running some at reduced load. As most existing thermal and nuclear power stations are most efficient when run continuously at full load, there is an efficiency penalty in balancing the supply side in this way. The expected introduction of significant intermittent renewable generation capacity, such as wind turbines and solar collectors, to the networks will further complicate the balancing of the grids, by creating uncertainty in the availability of parts of the generation sources. A means of storing energy during periods of low demand for later use during periods of high demand, or during low output from intermittent generators, would be of major benefit in balancing the grid and providing security of supply.

There are many emerging methods of energy storage in the market, including cryogenic energy storage, pumped hydroelectric, compressed air and chemical batteries among others. Power storage devices such as these have three phases of operation: charge, store and discharge. During periods of low demand, excess energy from the grid is used to charge the power storage devices. The energy is stored by the power storage device in its respective medium, such as cryogenic fluids, hydroelectric dam reservoirs or a battery's internal chemical potential. During periods of high demand this energy is released back into the grid to ensure it meets demand.

For a power storage device to be commercially viable, the following factors must be taken into account: capital cost per MW (power capacity) and MWh (energy capacity), round-trip cycle efficiency (RTE) and lifetime with respect to the number of charge and discharge cycles that can be expected from the initial investment and its environmental impact (country-dependent regulations vis-à-vis its carbon footprint and its potential use or production of hazardous chemicals). For widespread utility scale applications, the power storage device should be deployable where it is needed in electrical networks. In other words, it should exhibit a small footprint and its working principle should not require specific geographic constraints such as those that apply to hydroelectric power systems (e.g., reservoir space) or compressed air energy storage devices (e.g., underground caverns).

Cryogenic energy storage (CES) technology using a cryogen such as liquid air offers many advantages over the other available power storage technologies. CES systems are typically energy dense due to the physical properties of liquid air, highly locatable (because they use relatively small storage tanks that are geographically unconstrained), environmentally friendly (because their working principle does not involve the use or production of hazardous material, such as those found in most batteries, or the generation of carbon emissions) and relatively inexpensive (since they can utilise equipment that have been in use over many years in the liquid natural gas industry).

CES technology liquefies air from the external environment and stores it at low pressure which can then be vapourised and used to power turbines to generate electricity. In the charge or liquefaction phase of a CES system, low cost electricity at periods of low demand (off-peak period) or of excess supply from intermittent renewable generators is used to liquefy air in a liquefaction unit or sub-system. In the liquefaction process, two compressors are commonly used. A stream of air is first compressed to approximately 15-20 barA in a main air compressor (MAC), the air is then purified in an air purification unit (APU) and compressed in a second recycle air compressor (RAC) to approximately 55-65 barA. The stream can then enter a cooling and liquefaction system commonly referred to as a cold box. A cold box may generally be embodied as an insulated (typically metal) box, filled with high performance insulation materials such as perlite. Low temperature heat exchange processes occur within the cold box via components such as multi pass heat exchangers, phase separator, and expansion turbine stages of warm and cold turbines. The gas is cooled in the cold box until it substantially condenses to liquid. The liquid product is separated from the vapour phase and passed from the cold box to a cryogenic storage tank where it is stored for later use. The vapour phase may be returned through the multi-pass heat exchangers and then passed to supplement the stream of air upstream of the recycle air compressor to be further liquefied. The liquid product, such as liquefied air or cryogen, is stored in a storage tank during the storage phase. During the discharge phase, the liquid product is released into a power recovery unit or sub-system where it is pressurised, vapourised and heated to drive expansion turbines and produce electricity. The discharge or power recovery phase is often performed during the peak period where the electricity costs are high. CES technology relies on the thermodynamic energy potential between liquid air at cryogenic temperatures and gaseous air at ambient temperature and above. CES systems may perform various operations from the charging and discharging phase simultaneously, in this case the CES system liquefies, stores, and also generates power from the air simultaneously.

The pressurised stream of gas to be liquefied present in the liquefaction unit and the pressurised cryogen present in the power recovery unit are typically designated a 'process stream of the liquefaction unit' and a 'working fluid of the power recovery unit', respectively.

The round-trip efficiency of a CES system is defined as being the ratio of the net electrical energy output of the power recovery unit to the net electrical energy input of the liquefaction unit. In CES systems, heat produced as a result of the electrical energy input should be captured and re-used to maintain a high round-trip efficiency, any heat not captured and used may eventually dissipate into the environment, negatively impacting the round-trip efficiency.

For example, in the liquefaction process, the process stream is compressed, cooled and then expanded again. This process is repeated, each compression step increases the temperature of the process stream, and each cooling and expansion step significantly reduces the temperature, until the process stream has been fully liquefied. The term 'heat of compression' refers to the hot thermal energy embedded in a fluid that has been compressed. In other words, 'heat of compression' refers to the increase in sensible energy experienced by a fluid as a result of compression. Herein when heat is described as "transferred" from one location, fluid or component to another, this is the process where the hot thermal energy is transferred between the two locations, fluids or components. The method of transfer may comprise any of the typical methods, such as conduction, convection or radiation and will be obvious to the skilled reader.

The heat of compression can be recycled for use in the power recovery process. During the power recovery process, liquid air is pumped from a cryogenic storage tank as a working fluid and then vapourised, heated and expanded through a series of heat exchangers and expansion turbines. As the working fluid is heated and expanded through an expansion turbine it does work against the turbine to drive the turbine's rotation. The turbine may be coupled to a generator which in turn produces electrical energy which can be exported to the grid.

The heat of compression captured during the liquefaction phase can be utilised to increase the temperature of the working fluid in the power recovery unit prior to its expansion. Increasing the temperature of the working fluid improves the power output provided by the power recovery unit during the power recovery phase, which leads to an improvement of the round-trip efficiency of the CES system. This is because the hotter an expanding gas is, the more kinetic energy it has available to lose to the expansion turbine, which leads to more mechanical energy being generated by the turbine as it rotates faster or with more torque.

CES systems may use sub-systems which are designed to capture the heat of compression of the process stream generated in the liquefaction unit during the liquefaction phase, then store it in thermal energy storage devices (TESDs), and then release it to the working fluid of the power recovery unit during the power recovery phase. Such sub-systems are known as heat-of-compression recycle systems.

Known heat-of-compression recycle systems are typically concerned with recycling the heat of compression from the compressors and transferring it to the expansion turbines via the TESDs. The compressors, expansion turbines and TESDs are thermally coupled through heat exchangers and heat transfer fluids. For example, the process stream compressed by the compressor may pass through a heat exchanger with the heat transfer fluid flowing as a separate stream in the opposite direction through the heat exchanger (this type of heat exchanger is known as a counter-flow heat exchanger). In the heat exchanger, the heat of compression is transferred from the process stream to the heat transfer fluid which is then passed to the TESD. The heat is then transferred from the heat transfer fluid to a storage medium of the TESD for longer term storage. In cases where the heat transfer fluid is used as the storage medium, the heat transfer fluid is stored directly in the TESD. To distribute the heat to the working fluid of the power recover unit, the heat is extracted from the storage medium of the TESD and transferred to a heat transfer fluid which passes to a heat exchanger in the power recovery unit upstream of the expansion turbines. In cases where the heat transfer fluid is used as the storage medium, the heat transfer fluid is passed directly from the TESD to a heat exchanger in the power recovery unit upstream of the expansion turbines. In the heat exchanger in the power recovery unit the heat is transferred to the working fluid before it passes to the expansion turbines. The aim of a thermal energy storage device (TESD) is to capture, store and release thermal energy in a controlled manner.

The heat of compression generated during compression of a fluid is characterised not only by its grade but also by its quantity. The grade and the quantity of the heat embedded in a given fluid processed by a compressor can be said to be a function of the mass flow rate processed by the compressor, the compressor inlet temperature or pressure, the overall compressor pressure ratio and the efficiency of the compressor. Above ambient temperature, the grade of hot thermal energy increases with increasing temperature. Conversely, below ambient temperature, the grade of cold thermal energy increases with decreasing temperature. Typically, the thermal energy embedded in a fluid between ambient temperature and the freezing temperature or the lower bound temperature of a storage medium of a high-grade TESD is considered to be low-grade hot thermal energy, herein also referred to as low-grade heat, for example for molten salts as a storage medium of a high-grade TESD, these temperatures may be 140-150° C. and 190° C. respectively. Whereas the energy embedded in a fluid above this temperature is considered to be high-grade hot thermal energy, herein also referred to as high-grade heat. These values can vary depending on the design of the system using this heat of compression. If heat is extracted from a fluid embedded with high-grade heat such that the temperature of the fluid falls below the high/low-grade temperature threshold, the fluid is considered to be embedded with low-grade heat. The converse is true for heating a fluid. The lower bound temperature includes a margin of safety between the freezing temperature of the storage medium necessary to ensure that no crystallisation of the storage medium occurs during the working of the CES system. Freezing or crystallisation of the storage medium can cause damage to heat exchangers and other components in CES system and freezing of the heat exchange medium would require the CES system to be brought offline for an extended period of time to replace or restore the heat exchangers. This downtime may be weeks to months depending on the severity of the molten salt freezing.

The main air compressor in CES systems commonly have a higher pressure ratio than the recycle air compressor. The pressure increase across the main air compressor typically is higher than the recycle air compressor because the vapour phase from the phase separator supplements the inlet stream to the recycle air compressor. This leads to a larger mass flow upstream of the recycle air compressor. To achieve a similar pressure ratio (and therefore outlet temperature) as the main air compressor with this larger mass flow the recycle air compressor would be prohibitively expensive. For example, in a typical main air compressor, the air may be compressed from approximately 1 barA at 15-20° C. to 15-20 barA at 350-450° C. Whereas in a typical recycle air compressor, the air may be compressed from approximately 15-20 barA at 20-25° C. to 50-60 barA at 150-200° C. Since the process stream discharged from main air compressors can range from 350-450° C., both high-grade and low-grade heat can be extracted from it. However, since the process stream discharged from the recycle air compressor has a temperature significantly lower than the discharge of the main air compressor, at <200° C., only low-grade heat can be extracted from it.

Given that both high-grade and low-grade heat of compression can be extracted from a fluid compressed in a main air compressor, whereas only low-grade heat can only be extracted from a fluid compressed in a recycle air compressor, known heat-of-compression recycle systems typically employ two types of TESDs to store the high-grade and low-grade heat to avoid losing the heat of compression to the environment, and the resultant negative effects on the round-trip efficiency. Two TESDs are also mainly used because the optimal medium for storing the thermal energy at each grade is different and so are the requirements for storage.

There are several different types of TESDs which typically differ in their internal architecture and how efficient they are at storing high-grade or low-grade thermal energy. Some TESDs, commonly known as 'packed beds' are filled with a stationary solid phase through which a thermal energy transfer fluid circulates either to charge the TESD with thermal energy or to discharge it so as to supply it where it is needed. The stationary solid phase could be made of a porous solid medium or a packed bed of solid particles able to retain thermal energy. The packed bed matrix may comprise particles randomly stacked on each other made of sensible matter (e.g. pebbles) or made of latent-heat phase change matter, or of combination thereof. The packed bed matrix may comprise particles non-randomly stacked on each other made of sensible matter (e.g. metal oxide beads) or made of latent-heat phase change matter, or of combination thereof. The packed bed matrix may comprise fused particles (e.g. ceramics). More elaborate packed bed TESDs disclosed in WO2012020233A2 aim at providing a flexible system able to accommodate for asymmetric charge and discharge while keeping the pressure drop at an acceptable level and minimising the end effects by increasing the flow rate of the thermal energy transfer fluid towards the end of the charge and discharge of the TESDs. Other TESDs are filled with a stationary liquid phase through which at least one heat exchange coil passes allowing for the passage of a thermal energy transfer fluid. Other TESDs, commonly known as thermoclines, are made of a vessel containing two density-dependent regions of a single thermal energy transfer fluid at different temperatures, stacked on each other (due to their density difference). One version of a thermocline comprises two separate vessels, each accommodating the same thermal energy transfer fluid at two different temperatures (i.e. there is a warm tank and a cold tank).

High-grade TESDs commonly comprise molten salts or a packed bed as a storage medium, which are optimal for storing higher grade heat. Through these, pressurised thermal oil or the molten salts themselves may be used as a heat transfer fluid. Molten salt high-grade TESDs are typically a two-tank (Hot Molten Salt Tank and Cold Molten Salt Tank) system. In a CES system with a molten salt high-grade TESD and thermal oil as a heat transfer fluid, the high-grade heat of compression produced in the compressor may be captured in a heat exchanger downstream of the compressor and transported to the cold molten salt tank via the thermal oil. The thermal oil passes through a molten salt heat exchanger transferring the heat of compression to the molten salts and is then passed back to the heat exchanger downstream of the compressor to capture more heat, the heated molten salt meanwhile is stored in the hot molten salt tank. During the power recovery cycle, the hot molten salt is pumped to another molten salt heat exchanger, where the high-grade heat is transferred to the thermal oil. The (relatively) cold molten salt then passed to the cold molten salt tank in preparation to receive more heat from the hot thermal oils passing from the heat exchanger downstream of the compressor. The thermal oil meanwhile is passed to the heat exchangers in the power recovery unit upstream of the expansion turbines to transfer the heat to the working fluid of the power recovery unit. When molten salts are used as a heat transfer fluid they are passed directly to and from the hot or cold molten salt tank. Molten salts are an efficient high-grade storage medium however they cannot be used for low-grade applications because their lower bound temperature is approximately 190° C. The reason for this is because typical molten salts have a freezing temperature of below approx. 140-150° C. Some types of molten salt have lower freezing temperatures however, they are still higher than the upper limits of low-grade applications. This lower bound temperature of molten salts is typically selected to provide operators of a CES system ample time to react to a reduction in the temperature of the molten salts and to adjust operating parameters of the CES system to prevent the molten salts from freezing. Freezing of the molten salts is to be avoided at all costs.

Low-grade TESDs of CES systems commonly comprise a thermocline-based system comprising a single stratified tank preferably containing water or a mixture of water and glycol, which are optimal for storing lower grade heat. This type of low-grade TESD operation is based on thermal stratification process. Stratification is a natural process in which a fluid, in this case water, with a different temperature and density separates, namely warm water will float and settle on top of cold water. For low-grade TESDs of CES systems, during the charging operation, as air is compressed and low-grade heat is extracted from the process stream, the water of the stratified tank acts as the heat transfer fluid and is passed through the heat exchanger corresponding to the compressor and is heated up. It is then introduced into the top of the stratified low-grade TESD tank; the hot water stays on the top of the tank and the cold water stays on the bottom. During the discharging process, when the working fluid of the power recovery unit needs heat, the warm water is extracted and pumped to the heat exchangers in the power recovery unit where its heat is transferred to the working fluid. The water is cooled in the process and then passed back to the bottom portion of the stratified low-grade TESD tank. In a stratified low-grade TESD, the tank is always full, but the boundary of the two stratified fluids moves up and down depending on the charging/discharging phase. The thermocline (the thermal gradient between the how and cold portions of the fluid) can be as thick as 1 metre.

WO2019158921A1, incorporated herein by reference, discloses several CES systems comprising a low-grade TESD 16 and a high-grade TESD 12, which enable different grades of heat from both the main air compressor and the recycle air compressor to be transferred to the working fluid of the power recovery unit 33. FIG. 4A demonstrates a system in which the high-grade heat of compression of the process steam from the main air compressor 10 is captured by the heat exchanger 11 and stored in the high-grade TESD 12. The low-grade heat of compression of the process steam from the recycle air compressor 10 is captured by the heat exchanger 11 and stored in the low-grade TESD 12. FIGS. 5A-F demonstrate how the TESDs are coupled so as to transfer the different grades of thermal energy to the working fluid of the power recovery unit. FIG. 7A demonstrates a further CES system what comprises an additional heat exchanger 150 configured to capture the low grade-thermal heat of compression of the process steam from the main air compressor 10. This heat of compression is then transferred to the low-grade TESD 16. The configuration of the power recovery unit for transferring the different grades of heat are demonstrated in FIGS. 8A-B.

These systems address the practical implementation of a heat-of-compression recycle system within CES systems such that heats of compression of different grades and amounts, released and captured during the liquefaction phase, are subsequently utilised to improve the power output provided by the power recovery unit during the power recovery phase. Increasing the temperature of a working fluid prior to its expansion either via pre-stage heating or interstage reheating, using the stored heat of compression, results in an increase in the power output of the power recovery unit, which leads to an improvement of the round-trip efficiency of the CES system. Additionally, by storing the different grades of heat separately, they can be applied separately, to different parts of the process stream. Applying different grades of heat at different positions in the power recovery system was found to provide particularly efficient power recovery. Furthermore, storing different grades of heat separately from one another was noted as having numerous advantages, including efficient storage and efficient power recovery when applying the stored heat to the process stream.

The present inventors have appreciated that, while there are several advantages to capturing the heat of compression in different thermal energy stores, there may be further advantages to removing the low-grade TESD. This is because low-grade TESD pose technological challenges including, most importantly, thermal mixing on the stratification boundary. Over time, thermal diffusion at the boundary of the two stratified fluids contained within the low-grade TESD can erode the thermal/density gradient, causing the boundary to "blur". Eventually further diffusion results in total mixing of the stratified fluids as they tend towards thermal equilibrium, at this point the entire low-grade TESD vessel would have a single temperature. Therefore, the present inventors have appreciated that removing the low-grade TESD may be mitigate this issue.

WO2013034908A2, incorporated herein by reference, FIG. 14 exhibits a CES system wherein the heat-of-compression recycle system is made up of two separate closed loops sharing a single TESD 1002. The first closed loop indirectly receives the heats of compression generated by two compressors, the main air compressor 401 and the recycle air compressor 403, and stores this hot thermal energy in a single TESD 1002. The recycle air compressor 403 is located downstream of the main air compressor 401 and an air purification unit 402. However, in paragraph 1 on page 23, WO2013034908A2 describes the thermal energy captured from the compressors as having a temperature of 60-90° C. This document makes no reference to using a high-grade TESD or the storing of different grades of hot thermal energy from compressors. This system appears to therefore capture and store only low-grade thermal energy. As mentioned before, melting point of typical molten salts is much higher, at approximately 140-150° C. Therefore, a high-grade TESD, for example comprising a storage medium like molten salts, would not be applicable in this system. This document appears to provide no solution to the technological issues with low-grate TESDs.

Furthermore, air purifier units (e.g. 402 in WO2015181553A2) are used to extract contaminants and undesirable compounds from an air stream such that a "purified" air stream is produced for a process. These typically operate using an adsorption process whereby the contaminants, which may be gases, water molecules, hydrocarbon particles or any other undesired species, are adsorbed onto the surface of an adsorbent material. During the purification process the pressure and temperature must be specifically controlled to ensure efficient and optimal purification, such a system providing this control is disclosed in WO2015181553A2, which is incorporated herein, in its entirety by reference. As noted previously, the main compressor in CES systems can have very high output temperatures. Therefore, in WO2013034908A2, the high-grade thermal energy embedded in air output from the main compressor must have to be dumped into the atmosphere to avoid interrupting the process of the air purifier unit 402, which negatively impacts the round-trip efficiency. Furthermore, without cooling the air from the main air compressor, water within the air cannot be easily removed by the air purifier unit 402. To ensure sufficient water is removed the air purifier unit 402 would have to be significantly larger, leading to significant capital expenditure.

WO2019158921A1, incorporated herein by reference, in reference to WO2013034908A2, discusses the issue of storing different grades of thermal energy in a single TESD and notes that there are three ways to deal with two heats—of compression of different amounts and grades that are meant to be stored in a single TESD. This document notes:

1. They may be mixed in the conduits which transport the thermal energy from the compressors to the TESD;
2. the temperature of one heat of compression may be adjusted to that of the other heat of compression by employing at least one cooler; or
3. the temperature of both heats of compression can be adjusted to reach the same target temperature by using at least one cooler for each compressor.

WO2019158921A1, incorporated herein by reference, correctly notes that all of these three ways result in an undesirable loss of hot thermal energy grade. Cooling and mixing heats of compression of different grades results in an overall decrease in the temperature of the storage medium of the thermal energy store. This means less heat can be applied to the working fluid of the power recover unit which can lead to a reduction in the round-trip efficiency. However, the solution posed by WO2019158921A1 is to proceed with two TESDs of different grades.

The inventors have therefore observed that there is a need for an improved heat-of-compression recycle system to store and use heats of compression of different grades during the liquefaction phase in a single high-grade TESD, essentially removing the low-grade TESD, to mitigate the technological issues relating to low-grade TESDs discussed above, while avoiding the undesirable loss of hot thermal energy grade.

SUMMARY

Aspects of the present invention relate to cryogenic energy storage systems and methods as claimed in the appended claims.

The inventors have made improvements to known heat-of-compression recycle systems, by developing a system to store and use heats of compression generated by both the main air compressor and the recycle air compressor during the liquefaction phase in a single high-grade TESD. This system essentially allows for the removal of the low-grade TESD and avoids lowering the temperature and hence grade of the heat of compression. The disclosed systems are able to release the heat from the high-grade TESD to the working fluid of the power recovery unit to improve its power output during the power recovery phase.

Accordingly, in a first aspect, the present invention provides a cryogenic energy storage system, comprising:
  a liquefaction sub-system comprising:
    a first compressor;
    a first heat exchanger;
    a second compressor;
    a second heat exchanger;
    a third heat exchanger; and
    a first arrangement of conduits, having an upstream end and a downstream end, and configured to pass a process stream from the first compressor through the first heat exchanger, second compressor, second heat exchanger and third heat exchanger;
a thermal energy storage device configured to store high-grade heat; and
a second arrangement of conduits forming a closed circuit and configured to pass a heat transfer fluid between the thermal energy storage device, the first heat exchanger and the second heat exchanger;
wherein the first heat exchanger is positioned along the first arrangement of conduits downstream of the first compressor and configured to transfer at least a portion of high-grade heat of compression of the process stream from the first compressor, via the heat transfer fluid, to the thermal energy storage device;
wherein the second heat exchanger is positioned along the first arrangement of conduits downstream of the second compressor and configured to transfer at least a portion of high-grade heat of compression of the process stream from the second compressor, via the heat transfer fluid, to the thermal energy storage device; and
wherein the third heat exchanger is positioned along the first arrangement of conduits downstream of the second heat exchanger and configured to transfer at least a portion of low-grade heat of compression of the process stream from the second heat exchanger to the second compressor, thereby transferring the at least portion of low-grade heat of compression back into the second compressor.

By transferring at least a portion of the low-grade heat of compression from the second heat exchanger back into second compressor, the third heat exchanger enables the second compressor to compress the process stream to a much higher temperature, thus enabling it to generate high-grade heat of compression. This high-grade heat of compression can then be stored in the thermal energy storage device, via the heat transfer fluid and second heat exchanger. As such, both high and low-grade heats can be captured and stored in a single high-grade thermal energy storage device.

In some embodiments, the liquefaction sub-system may further comprise an air purification unit positioned along the first arrangement of conduits downstream of the first heat exchanger, wherein the air purification unit may be configured to purify the process stream.

The liquefaction sub-system may further comprise a first air conditioning unit positioned along the first arrangement of conduits between the air purification unit and the first heat exchanger, wherein the first air conditioning unit may be configured to substantially or entirely remove the heat of compression of the process stream from the first compressor.

The liquefaction sub-system may further comprise a fourth heat exchanger positioned along the first arrangement of conduits between the first heat exchanger and air purification unit and configured to transfer at least a portion of low-grade heat of compression of the process stream from the first heat exchanger to the process stream downstream of the air purification unit. Transferring a portion of low-grade heat of compression to the process stream downstream of the air purification unit allows the process stream to be compressed to a higher temperature in the second compressor, which in turn allows for the second compressor to generate high-grade heat of compression which can be stored in the single high-grade thermal energy storage device. As such, the heats of compression from both compressors can be captured and stored in a single high-grade thermal energy storage device.

The third heat exchanger being configured to transfer the at least portion of low-grade heat of compression of the process stream from the second heat exchanger to the second compressor may comprises transferring the at least portion of low-grade heat of compression of the process stream from the second heat exchanger to the process stream upstream of the second compressor.

The liquefaction sub-system may further comprise a third arrangement of conduits, having an upstream end configured to be coupled to a cold box and a downstream end, wherein the third arrangement of conduits may be configured to pass a return stream from the cold box to supplement the process stream upstream of the second compressor.

The third heat exchanger being configured to transfer the at least portion of low-grade heat of compression of the process stream from the second heat exchanger to the second compressor may comprise transferring the at least portion of low-grade heat of compression of the process stream from the second heat exchanger to the return stream before it supplements the process stream. By transferring the low-grade heat of compression to the return stream, the third heat exchanger can heat the return stream to be similar to the heat of the process stream. This avoids the mixing of streams at different temperatures, which can reduce the energy potential of the process stream.

The third heat exchanger being configured to transfer the at least portion of low-grade heat of compression of the process stream from the second heat exchanger to the second compressor may comprise transferring the at least portion of low-grade heat of compression of the process stream from the second heat exchanger to the process stream after it is supplemented by the return stream.

In a second aspect, the present invention provides a cryogenic energy storage system, comprising:
a liquefaction sub-system comprising:
    a first compressor;
    a first heat exchanger;
    a second compressor;
    a second heat exchanger; and
    a first arrangement of conduits, having an upstream end and a downstream end, and configured to pass a process stream through the first compressor, first heat exchanger, second compressor and second heat exchanger;
a thermal energy storage device configured to store high-grade heat;
a first expander;
a third compressor; and
a second arrangement of conduits forming a closed circuit and configured to pass a heat transfer fluid between the thermal energy storage device, the first heat exchanger, the first expander, the second heat exchanger and the third compressor;
wherein the first heat exchanger is positioned along the first arrangement of conduits downstream of the first compressor and configured to transfer at least a portion of high-grade heat of compression of the process stream from the first compressor, via the heat transfer fluid, to the thermal energy storage device;
wherein the second heat exchanger is positioned along the first arrangement of conduits downstream of the second compressor and configured to transfer at least a portion of low-grade heat of compression of the process stream from the second compressor, via the heat transfer fluid, to the third compressor; and
wherein the third compressor is positioned along the second arrangement of conduits downstream of the second heat exchanger and is configured to compress the heat transfer fluid and transfer at least a portion of high-grade heat of compression of the heat transfer fluid from the third compressor to the thermal energy storage device; and wherein the first expander is positioned along the second arrangement of conduits downstream of the thermal energy storage device and configured to expand the heat transfer fluid and to extract work therefrom.

By transferring the low-grade heat of compression from the process stream downstream of the second compressor to the heat transfer fluid and compressing said fluid in the third compressor, the heat transfer fluid may be embedded with high-grade heat of compression which can be stored in the high-grade thermal energy storage device. This allows for the capture of substantially all of the heat generated by the second compressor and the storage in a single high-grade thermal energy storage device while maintaining low compression temperatures in the second compressor. This system further allows for the extraction of work from the heat transfer fluid.

In some embodiments, the liquefaction sub-system may further comprise a third heat exchanger positioned along the first arrangement of conduits downstream of the first heat exchanger; wherein the third heat exchanger may be configured to transfer at least a portion of low-grade heat of compression of the process stream from the first heat exchanger, via the heat transfer fluid, to the third compressor. By transferring the low-grade heat of compression from the first compressor, allows for the capture of substantially all of the heat generated by the first compressor.

The liquefaction sub-system may further comprise an air purification unit positioned along the first arrangement of conduits upstream of the second compressor, wherein the first air purification unit is configured to purify the process stream.

The liquefaction sub-system may further comprise a first air conditioning unit positioned along the first arrangement of conduits upstream of the air purification unit, wherein the first air conditioning unit may be configured to substantially or entirely remove the heat of compression of the process stream from the first compressor.

The liquefaction sub-system may further comprise a third arrangement of conduits, having an upstream end configured to be coupled to a cold box and a downstream end, wherein the third arrangement of conduits may be configured to pass a return stream from the cold box to supplement the process stream upstream of the second compressor.

The liquefaction sub-system may further comprise a cold box positioned at the downstream end of the first arrangement of conduits and configured to at least partially liquefy the process stream, forming a liquefied product.

The liquefaction sub-system may further comprise a second air conditioning unit positioned along the first arrangement of conduits upstream of the cold box, wherein the second air conditioning unit may be configured to substantially or entirely remove the heat of compression of the process stream from the second compressor.

The cold box may be configured to pass the return stream, comprising at least a portion of any non-liquefied process stream, to the third arrangement of conduits.

The cold box may be configured to pass at least a portion of the liquefied product to a cryogenic storage tank.

In some embodiments, the heat transfer fluid may be a first heat transfer fluid, and the cryogenic energy storage system may further comprise:

a power recovery sub-system comprising:
a pump;
an evaporator;
at least one heater;
an expansion stage corresponding to each of the at least one heater;
a fourth arrangement of conduits, having an upstream end and a downstream end, and configured to pass a working fluid from the pump through the evaporator and each of the at least one heater and corresponding expansion stage, wherein each heater is positioned upstream of its corresponding expansion stage; and
a fifth arrangement of conduits forming a closed circuit and configured to pass a second heat transfer fluid between the thermal energy storage device and each heater of the at least one heater;
wherein each heater is configured to transfer at least a portion of high-grade heat of compression from the thermal energy storage device, via the second heat transfer fluid, to the working fluid; and
wherein each expansion stage is configured to expand the working fluid and to extract work therefrom.

The power recovery sub-system may further comprise a pre-heater positioned along the fourth arrangement of conduits upstream of the first heater, wherein the pre-heater may be configured to receive at least a portion of the exhaust from the final expansion stage and to transfer at least a portion of the heat from the exhaust of the final expansion stage to the working fluid upstream of the first heater. By pre-heating the working fluid using the exhaust the pre-heater may prevent the working fluid from freezing the heat transfer fluid in the heater which can prevent potential blockages.

The pump may be configured to pump a liquefied product from a cryogenic storage tank and to pressurise it, forming the working fluid.

In some embodiments, the first and second heat transfer fluids may be the same fluid and the second arrangement of conduits and the fifth arrangement of conduits may be fluidly connected and share the same heat transfer fluid.

According to a further aspect of the present invention there is provided a method for heat-of-compression storage in a cryogenic energy storage system, the method comprising:

providing a liquefaction sub-system comprising a first compressor and a second compressor;
providing a thermal energy storage device configured to store high-grade heat;
compressing a process stream in the first compressor;
capturing at least a portion of high-grade heat of compression of the process stream from the first compressor and storing it, via a heat transfer fluid, in the thermal energy storage device;
compressing the process stream in the second compressor;
capturing at least a portion of high-grade heat of compression of the process stream from the second compressor and storing it, via the heat transfer fluid, in the thermal energy storage device; and
capturing at least a portion of low-grade heat of compression of the process stream from the second compressor and transferring it back into the second compressor.

By transferring at least a portion of low-grade heat of compression from the second compressor back into second compressor, the process stream may be compressed and reach a much higher temperature thus enabling the second compressor to generate high-grade heat of compression. This high-grade heat of compression can then be stored in the thermal energy storage device, via the heat transfer fluid. As such, both high and low-grade heats can be captured and stored in a single high-grade thermal energy storage device.

The method may comprise purifying the process stream after the at least portion of high-grade heat of compression of the process stream from the first compressor has been captured.

The method may comprise the step of conditioning the process stream to substantially or entirely remove the heat of compression of the process stream from the first compressor before the process stream is purified.

The method may comprise, after the at least portion of high-grade heat of compression of the process stream from the first compressor has been captured, capturing at least a portion of low-grade heat of compression of the process stream from the first compressor and transferring it to the process stream after it has been purified. Transferring a portion of the low-grade heat of compression to the process stream after it is purified allows the process stream to be compressed to a higher temperature in the second compressor, which in turn allows for the second compressor to generate high-grade heat of compression which can be stored in the single high-grade thermal energy storage device. As such, both high and low-grade heats can be captured and stored in a single high-grade thermal energy storage device.

Transferring the at least portion of the low-grade heat of compression of the process stream from the second compressor back into the second compressor may comprise transferring the at least a portion of the low-grade heat of compression of the process stream from the second compressor to the process stream before the process stream is compressed in the second compressor.

The method may comprise supplementing the process stream with a return stream before the process stream is compressed in the second compressor.

Transferring the at least portion of low-grade heat of compression of the process stream from the second compressor back into the second compressor may comprise transferring the at least portion of low-grade heat of compression of the process stream from the second compressor to the process stream after the process stream has been supplemented by the return stream.

Transferring the at least portion of low-grade heat of compression of the process stream from the second compressor back into the second compressor may comprise transferring the at least portion of low-grade heat of compression of the process stream from the second compressor to the return stream before it supplements the process stream.

The method may comprise conditioning the process stream to substantially or entirely remove the heat of compression of the process stream from the second compressor after the at least portion of low-grade heat of compression of the process stream from the second compressor has been captured.

According to a further aspect of the present invention there is provided a method for heat-of-compression storage in a cryogenic energy storage system, the method comprising:
  providing a liquefaction sub-system comprising a first compressor, a second compressor, a third compressor and an expander;
  providing a thermal energy storage device configured to store high-grade thermal energy;
  compressing a process stream in the first compressor;
  capturing at least a portion of high-grade heat of compression of the process stream from the first compressor and storing it in the thermal energy storage device;
  compressing the process stream in the second compressor;
  capturing at least a portion of low-grade heat of compression of the process stream from the second compressor and transferring it, via a heat transfer fluid, to the third compressor;
  compressing the heat transfer fluid in the third compressor;
  capturing at least a portion of high-grade heat of compression of the heat transfer fluid from the third compressor and storing it in the thermal energy storage device; and
  expanding the heat transfer fluid in the expander and extracting work therefrom.

By capturing the low-grade heat of compression from the process stream downstream in a heat transfer fluid and compressing said fluid in the third compressor, the heat transfer fluid may be embedded with high-grade heat of compression which can be stored in the high-grade thermal energy storage device. This allows for the capture of substantially all of the heat generated by the second compressor and the storage in a single high-grade thermal energy storage device while maintaining low compression temperatures in the second compressor. This system further allows for the extraction of work from the heat transfer fluid.

The method may comprise, after the at least portion of high-grade heat of compression of the process stream from the first compressor has been captured, capturing at least a portion of low-grade heat of compression of the process stream from the first compressor and transferring it, via the heat transfer fluid, to the third compressor.

The method may comprise purifying the process stream before the process stream is compressed in the second compressor.

The method may comprise the step of conditioning the process stream to substantially or entirely remove the heat of compression of the process stream from the first compressor before the process stream is purified.

The method may comprise the step of conditioning the process stream to substantially or entirely remove the heat of compression of the process stream from the second compressor after the at least portion of low-grade heat of compression of the process stream from the second compressor has been captured.

The method may comprise the step of supplementing the process stream with a return stream before the process stream is compressed in the second compressor.

The methods above may comprise at least partially liquefying the process stream, forming a liquified product.

The method may comprise the step of passing at least a portion of the liquefied product to a cryogenic storage tank.

The method may comprise the step of passing at least a portion of any non-liquefied process stream as the return stream to supplement the process stream.

The methods above may further comprise heating a working fluid with at least a portion of high-grade heat of compression stored in the thermal energy storage device, and expanding the working fluid in an expansion stage and extracting work therefrom.

The method may further comprise pre-heating the working fluid with an exhaust stream from the expansion stage before the working fluid is heated.

The method may further comprise the step of pumping a liquefied product from a cryogenic storage tank and pressurising it to form the working fluid.

It is understood that the invention is not limited to the embodiments, aspects or examples described herein and various modifications and improvements can be made without departing from the concepts disclosed herein. Except where incompatible, any of the features described herein may be employed separately or in combination with any of the other features. The present disclosure includes all combinations and sub-combinations of one or more of the features described herein.

DETAILED DESCRIPTION

Figure 1:
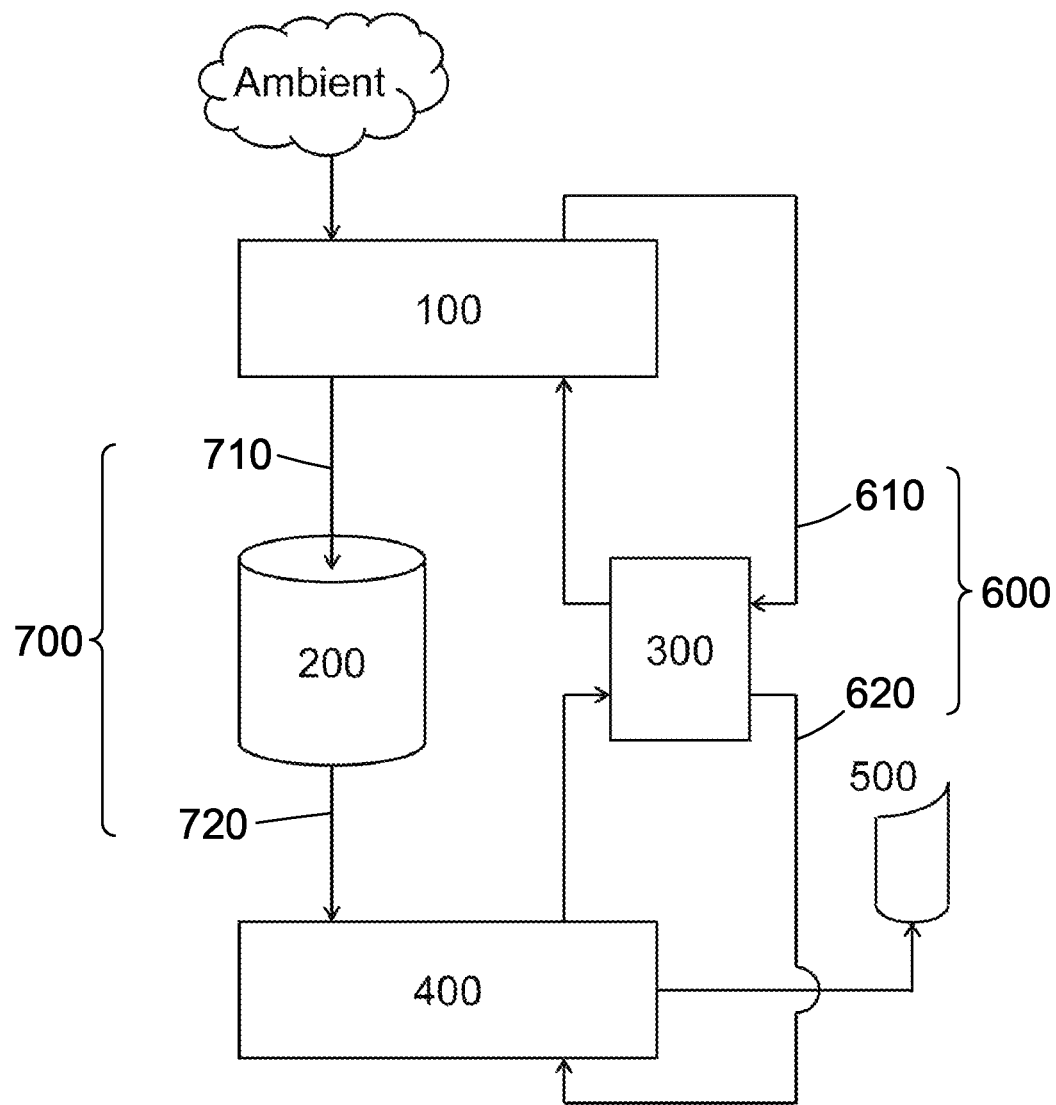
FIG. 1 is a general schematic illustration of a cryogenic energy storage (CES)

The physical values such as pressures, temperatures and mass flow rates used in the following description are intended to illustrate the invention. A person skilled in the art will understand that a wide range of possible values of these physical quantities exist depending on the particular design of a CES system and requirement of the user.

In this description and the accompanying figures, the same or similar elements are denoted by the same reference numerals.

FIG. 1 is a schematic illustration of a cryogenic energy storage (CES) system which comprises a liquefaction sub-system 100, a cryogenic storage tank 200, a power recovery sub-section 400, and a high-grade thermal energy storage device (TESD) 300.

In the charging phase of the CES system, the liquefaction sub-system 100 is configured to receive and liquefy ambient air through a series of compression and cooling stages. The stream of air or liquid air passing through the liquefaction sub-system 100 is herein referred to as the process stream of the liquefaction sub-system 100. The liquid air produced by the liquefaction sub-system 100, herein also referred to as cryogen, may then passed to the cryogenic storage tank 200 through a first cryogen conduit 710 of an arrangement of cryogen conduits 700. The liquefaction sub-system 100 may adopt any of the configurations depicted in FIGS. 2 to 6 or described below.

The high-grade TESD 300 is configured to receive the high-grade heat of compression of the process stream from the liquefaction sub-system 100 via a heat transfer fluid and store it in a storage medium. The heat transfer fluid is passed from the high-grade TESD 300 through the liquefaction sub-system 100 where it is embedded with the high-grade heat of compression generated as a result of the compression of the process stream of the liquefaction sub-system 100. The heat transfer fluid is then passed through the high-grade TESD 300 where the high-grade heat is transferred to a storage medium of the high-grade TESD 300.

During the storage phase of the CES system, the cryogen passed from the liquefaction sub-system 100 is stored in the cryogenic storage tank 200 and may be stored for an extended period under low pressure. It is understood that the cryogenic storage tank 200 may be formed of a plurality of cryogenic storage tanks with a common connection to the liquefaction sub-system 100 and/or the power recovery sub-system 400 and a common header in fluid communication. As is common practice in the safe design of all cryogenic energy storage systems, the pressure in the cryogenic storage tank 200 described herein may be prevented from rising above design value by means of a pressure relief valve (not shown).

In the discharging phase of the CES system, the cryogen is passed from the cryogenic storage tank 200 to the power recovery sub-system 400 through a second cryogen conduit 720 of the arrangement of cryogen conduits 700. The cryogen, liquid air or air passing through the power recovery sub-system 400 is herein referred to as the working fluid. The power recovery sub-system 400 is configured to pressurise, vaporise, heat, and expand the working fluid. The mechanical energy recovered from the expanding working fluid can then be converted to electrical energy. The exhaust from the power recovery sub-system 400 may be exhausted into atmosphere through a vent 500 or recycled into another system co-located to, or part of, the current CES system (e.g. any part of the power recovery sub-system, liquefaction sub-system or other part of the broader CES system). The power recovery sub-system 400 may adopt any of the configurations depicted in FIG. 7 or 8 or described below.

The CES system may comprise any of the liquefaction sub-system 100 configurations depicted in FIGS. 2 to 6 or described below in combination with any of the power recovery sub-system 400 configurations depicted in FIG. 7 or 8 or described below.

In the discharging phase, the CES system is configured to transfer the stored high-grade heat from the high-grade TESD 300 to the power recovery sub-system 400 via a heat transfer fluid. The heat transfer fluid, embedded with high-grade thermal energy, is passed from the high-grade TESD 300 through the power recovery sub-system 400. In the power recovery sub-system 400, the high-grade heat embedded in the heat transfer fluid is transferred to the working fluid before the working fluid is expanded which improves the power output of the power recovery sub-system during the discharging phase. This leads to an improvement of the round-trip efficiency of the CES system. The cool heat transfer fluid is then passed back to the high-grade TESD 300 for reheating.

The heat transfer fluid used to transfer the high-grade heat from the liquefaction sub-system 100 to the high grade TESD 300 may be passed through an arrangement of heat transfer conduits 610 forming a closed circuit configured to pass the heat transfer fluid between the liquefaction sub-system 100 and the high-grade TESD 300. The heat transfer fluid configured to transfer the high-grade heat from the high-grade TESD 300 to the power recover sub-system 400 may be passed through a further arrangement of heat transfer conduits 620 forming a closed circuit configured to pass the heat transfer fluid between the high-grade TESD 300 and the power recover sub-system 400. Alternatively, the above-mentioned heat transfer fluids may be the same heat transfer fluid and the above-mentioned arrangements of heat transfer conduits may be fluidly connected to make a single combined arrangement of heat transfer conduits 600 connecting the liquefaction sub-system 100, power recover sub-system 400 and the high-grade TESD 300. In this case, the combined arrangement of conduits 600 may share the same heat transfer fluid and pass the heat transfer fluid between the liquefaction sub-system 100, the high-grade TESD 300 and the power recover sub-system 400. The heat transfer fluid(s) circulating through the liquefaction sub-system 100, high-grade TESD 300 and power recover sub-system 400 may be gas such as air or compressed air, or liquid such as water or a mixture of water and glycol, or preferably thermal oil or a mixture of thermal oils (synthetic oils, natural oils, mineral oils) or molten salts.

Although "liquid air", "air" or "cryogen" are used throughout this description, the present invention is not limited to producing and using only liquid air or air but may be used for producing and using other low temperature fluids such as liquid nitrogen, liquid oxygen, liquid natural gas (LNG).

Figure 2:
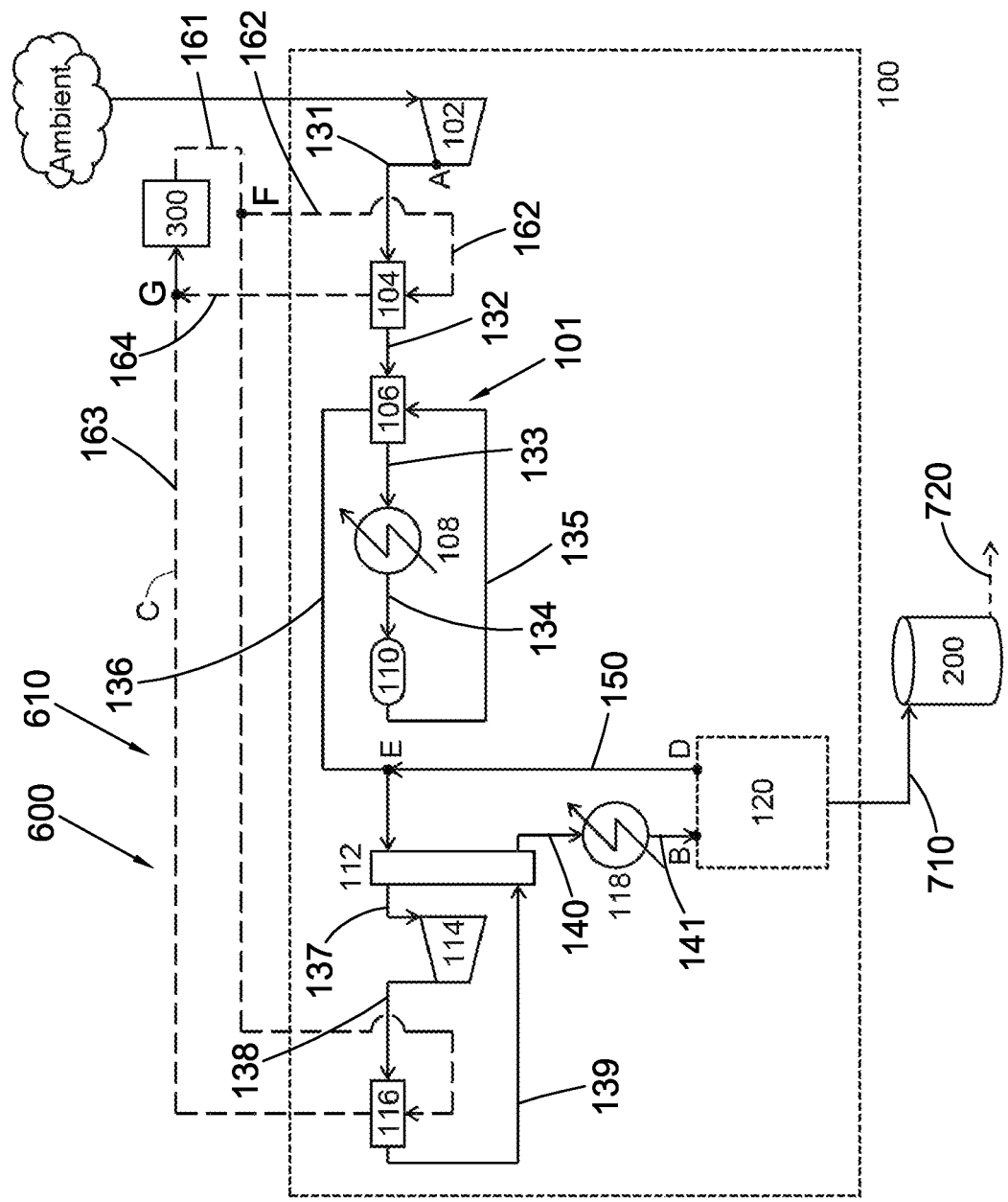
FIG. 2 is a detailed schematic illustration of a CES system, in particular the liquefaction sub-system, which makes use of recuperators.

FIG. 2 illustrates a CES system comprising a liquefaction sub-system 100 and a high-grade TESD 300. The liquefaction sub-system 100 is configured to convert a stream of ambient air into liquid air, or cryogen, for storage in a cryogenic storage tank 200. The liquefaction sub-system 100 may comprise a main air compressor (MAC) 102, a main air compressor high-grade heat exchanger (MAC HG HX) 104, a main air compressor recuperator heat exchanger (MAC Recuperator) 106, a main air compressor air conditioner (MAC AC) 108, an air purification unit (APU) 110, a recycle air compressor recuperator heat exchanger (RAC Recuperator) 112, a recycle air compressor (RAC) 114, a recycle air compressor high-grade heat exchanger (RAC HG HX) 116 and a recycle air compressor air conditioner (RAC AC) 118 and a cold box 120.

The liquefaction sub-system 100 may further comprise a first arrangement liquefaction of conduits 101, having an upstream end A and a downstream end B configured to pass the process stream of the liquefaction sub-system 100 from the MAC 102 going through the MAC HG HX 104, the MAC Recuperator 106, the MAC AC 108, the APU 110, the MAC Recuperator 106 a second time, the RAC Recuperator 112, the RAC 114, the RAC HG HX 116, the RAC Recuperator 112 a second time, the RAC AC 118, and to the cold box 120. The first arrangement of conduits is indicated by the line AB in FIG. 2 where the upstream end is at point A, and the downstream end is at point B.

The first arrangement of conduits 101 of the embodiment of FIG. 2 includes liquefaction conduits fluidly connected as follows: a first conduit 131 connecting the MAC 102 to the MAC HG HX 104, a second conduit 132 connecting the MAC HG HX 104 and the MAC Recuperator 106, a third conduit 133 connecting the MAC Recuperator 106 to the MAC AC 108, a fourth conduit 134 connecting the MAC AC 108 to the APU 110, a fifth conduit 135 connecting the APU 110 to the MAC Recuperator 106, a sixth conduit 136 connecting the MAC Recuperator 106 to the RAC Recuperator 112, a seventh conduit 137 connecting the RAC Recuperator 112 to the RAC 114, an eight conduit 138 connecting the RAC 114 to the RAC HG HX 116, a ninth conduit 139 connecting the RAC HG HX 116, to the RAC Recuperator 112, a tenth conduit 140 connecting the RAC Recuperator 112 to the RAC AC 118 and an eleventh conduit 141 connecting the RAC AC 118 to the cold box 120.

The CES system may further comprise a second arrangement of heat transfer conduits 610, 600 forming a closed circuit and configured to pass a heat transfer fluid between the high-grade TESD 300, the MAC HG HX 104 and the RAC HG HX 116. The second arrangement of heat transfer conduits is indicated by closed circuit C in FIG. 2.

The second arrangement of heat transfer conduits 610, 600 of the embodiment of FIG. 2 includes heat transfer conduits fluidly connected as follows: a first conduit 161 connecting the high-grade TESD 300 to the RAC HG HX 116, a second conduit 162 connecting a junction F in the first conduit 161 to the MAC HG HX 104, a third conduit 163 connecting the RAC HG HX 116 and the high-grade TESD 300, and a fourth conduit 164 connecting the MAC HG HX 104 to a junction G in the third conduit 163. It will be understood that the second conduit 162 could connect the high-grade TESD 300 and the MAC HG HX 104 directly and that the fourth conduit 164 could connect the MAC HG HX 104 directly to the high-grade TESD 300 in place of junctions F and G respectively.

The liquefaction sub-system 100 may further comprise a third arrangement of liquefaction conduits 150, having an upstream end configured to be coupled to the cold box 120 and a downstream end and configured to pass a second process stream, herein referred to as a return process stream or return stream, from the cold box 120 at the upstream end to supplement the process stream of the first arrangement of conduits upstream of the RAC Recuperator 112 at the downstream end. The third arrangement of conduits is indicated by the line DE in FIG. 2 where the upstream end is at point D, and the downstream end is at point E. The third arrangement of conduits in the embodiment of FIG. 2 includes a conduit 150 connecting the cold box 120 and to a junction E in the sixth liquefaction conduit 136.

During the charging phase of the CES system, the MAC 102 compresses ambient air (i.e. air present in the atmosphere surrounding the CES system) from ambient air pressure to a first pressure, which may be approximately between two bar to tens of bar. As the ambient air is compressed it is significantly heated and its temperature may raise from ambient temperature to above approximately 400° C. depending on the ambient conditions as it is embedded with heat of compression. At such temperatures the process stream is embedded with high-grade heat of compression.

Downstream of the MAC 102, along the first arrangement of conduits, the MAC HG HX 104 receives the hot compressed process stream from the MAC 102. The MAC HG HX 104 also receives a stream of heat transfer fluid from the second arrangements of conduits. The MAC HG HX 104 is configured to transfer at least a portion of the high-grade heat of compression of the process stream to the heat transfer fluid. As a result, the process stream may be cooled to approximately 180-220° C., therefore the process stream may still be embedded with the residual low-grade heat of compression.

The MAC Recuperator 106 is configured to receive the process stream at two different locations and transfer the low-grade heat of compression of the process stream at a first location to the process stream at a second location. Essentially, forming a recuperation loop for the low-grade heat of compression where the heat is transferred from one location to another. The two portions of the process stream passing through the MAC Recuperator 106 may pass through two independent fluid pathways within the MAC Recuperator 106 to prevent mixing.

Downstream of the MAC HG HX 104, along the first arrangement of conduits, the MAC Recuperator 106 receives the process stream from the MAC HG HX 104. The MAC Recuperator 106 also receives the process stream downstream of the APU 110 (described below). The MAC Recuperator 106 is configured to transfer at least a portion of the low-grade heat of compression from the process stream passing from the MAC HG HX 104 to the process stream passing from the APU 110. The process stream passing from the MAC HG HX 104 may be cooled from approximately 210° C. to 60° C. using the outlet stream to the APU 110. The part of the process stream passing from the MAC HG HX 104 and cooled in the MAC Recuperator 106 is then passed to the MAC AC 108, whereas the part of the process stream passing from the APU 110 and heated in the MAC Recuperator 106 is then passed to the RAC Recuperator 112 (described below).

Downstream of the MAC Recuperator 106, along the first arrangement of conduits, the MAC AC 108 receives the process stream from the MAC Recuperator 106 and is configured to substantially or entirely remove the final heat of compression from the process stream. The cooling provided by the MAC AC 108 determines the final temperature of the process stream before it is passed to the APU 110, and therefore determines the inlet temperature for the APU 110. The MAC AC 108 may cool the process stream down to approximately ambient temperature. The MAC AC 108 may also remove a significant portion of the moisture from the process stream due to condensation.

Downstream of the MAC AC 108, along the first arrangement of conduits, the APU 110 receives the process stream from the MAC AC 108 and is configured to purify it by removing water and $CO_2$ which would otherwise freeze and block the liquefaction sub-system during operation. The APU 110 may purify the process stream through molecular adsorption, Temperature Swing Adsorption (TSA), Pressure Swing Adsorption (PSA), or a combination of both. Specific adsorbents may be employed within the APU that preferentially remove the $CO_2$ and water from the process stream. The process stream may leave the APU 110 at approximately ambient temperature or slightly above due to possible exothermic processes in the APU 110.

As noted above, the process stream is then passed through the MAC Recuperator 106 again. Downstream of the APU 110, along the first arrangement of conduits, the MAC Recuperator 106 receives the process stream from the APU 110 and also receives the process stream from the MAC HG HX 104. The cool process stream leaving the APU 110 may be at approximately ambient temperature and is used in the MAC Recuperator 106 to cool the hotter process stream leaving the MAC HG HX 104 which may be at approximately 190-230° C. The process stream passing from the APU 110 may be heated in the MAC Recuperator 106 to approximately 180-225° C. using the outlet stream from the MAC HG HX 104. The part of the process stream passing from the APU 110 and heated in the MAC Recuperator 106 is then passed to the RAC Recuperator 112. The MAC AC 108 or APU 110, or combination of both, may comprise further refrigeration systems such as coolers, or chiller systems to further aid removing water from the process stream.

Downstream of the MAC Recuperator 106, along the first arrangement of conduits, the RAC Recuperator 112 receives the process stream passing from the MAC Recuperator 106. The RAC Recuperator 112 also receives the process stream passing from the RAC HG HX 116 (described below). Similar to the MAC Recuperator 106, the RAC Recuperator 112 is configured to receive the process stream at two different locations, capture the heat from the process stream at a first location, and transfer it to another part of the process stream at a second location. Essentially, forming a recuperation loop for the heat of the process stream where the heat is transferred from one location to another. The two portions of the process stream passing through the RAC Recuperator 112 may pass through two independent fluid pathways within the RAC Recuperator 112 to prevent mixing.

As described in the background section above, in a typical CES system, the compression of the process stream in the recycle air compressor will generate heat of compression. However, the outlet temperature of such a recycle air compressor may have a temperature of approximately 190° C., therefore the heat of compression of the output stream is typically of low-grade only.

The RAC Recuperator 112 is configured to transfer at least a portion of the low-grade heat of compression from the process stream passing from the RAC HG HX 116 (described below), to the process stream passing from the MAC Recuperator 106 and into the RAC 114. The process stream passing from the MAC Recuperator 106 may therefore be heated to above 190° C. using the outlet stream of the RAC HG HX 116. As a result, the inlet temperature of the RAC 114 is much higher than a typical recycle air compressor which causes the discharge temperature of the RAC 114 to be significantly higher and may match the MAC 102 outlet temperature of above approximately 400° C. The process stream passing from the MAC Recuperator 106 and heated in the RAC Recuperator 112 is then passed to the RAC 114 (described below), whereas the process stream passing from the RAC HG HX 116 and cooled in the RAC Recuperator 112 is then passed to the RAC AC 118 (described below).

Downstream of the RAC Recuperator 112, along the first arrangement of conduits, the RAC 114 receives the process stream passing from the RAC Recuperator 112. During the previously described stages the pressure of the process stream may drop slightly due to leaks or other environmental factors. The RAC 114 may however compress the process stream from approximately the first pressure (accounting for any pressure drops) to a second pressure, which may be approximately several tens of bar. As the process stream is compressed its temperature significantly increases as heat of compression is generated in the stream. Due to the increased inlet temperature of the RAC 114, the outlet temperature of above approximately 400-440° C. In comparison to the outlet process stream of a typical recycle air compressor the outlet process stream of RAC 114 may now be embedded with high-grade thermal energy.

Downstream of the RAC 114, along the first arrangement of conduits, the RAC HG HX 116 receives the process stream passing from the RAC 114. The RAC HG HX 116 also receives a stream of heat transfer fluid from the second arrangements of conduits. The RAC HG HX 116 is configured to transfer at least a portion of the high-grade heat of compression from the process stream to the heat transfer fluid. As a result, the process stream may be cooled to approximately 210° C., and therefore may still be embedded with the residual low-grade heat of compression.

As mentioned above, downstream of the RAC HG HX 116 along the first arrangement of conduits, the RAC Recuperator 112 receives the process stream passing from the RAC HG HX 116 as well as the process stream passing from the MAC Recuperator 106. The RAC Recuperator 112 is configured to transfer a least a portion of the low-grade heat of compression from the process stream passing from the RAC HG HX 116 to the process stream passing from the MAC Recuperator 106. The process stream passing from the RAC HG HX 116 and cooled in the RAC Recuperator 112 is then passed to the RAC AC 118.

Downstream of the RAC Recuperator 112 along the first arrangement of conduits, the RAC AC 118 receives the process stream passing from the RAC Recuperator 112. The RAC AC 118 is configured to remove the residual heat of compression from the process stream before it is passed to the cold box 120. The RAC AC 118 may cool the process stream down to approximately ambient temperature.

Downstream of the RAC AC 118, along the first arrangement of conduits, the cold box 120 may receive the process stream passing from the RAC AC 118. The cold box 120, as described in the background section above, is configured to cool the process stream until it substantially condenses to liquid. The liquid product is separated from the vapour phase and at least a portion is passed to the cryogenic storage tank 200 for storage. At least a portion of the vapour phase (i.e., any non-liquefied process stream) may to used cool the process stream entering the cold box 120 to aid liquefaction. This is done by passing the vapour phase through the cold box 120 in a counter-flow direction to the process stream entering the cold box 120. The return stream is formed of the vapour phase after it has been passed through the cold box 120 and is passed through the third arrangement of conduits to supplement the process stream upstream of the RAC Recuperator 112.

The return stream from the cold box 120 may be at ambient temperature and it may have a much larger mass flow rate than the process stream passing from the outlet to the MAC Recuperator 106. Therefore the return stream can have a greater influence on the temperature of the inlet of the RAC 114. The mass flow rate of the return stream is typically larger than the process stream passing from the MAC Recuperator 106 because of the use of expansion turbines in the cold box 120 to liquefy the process stream. For example, the ratio of the mass flow rate of the mass flow rate of the return stream to the process stream before being joined by the return stream may be between approximately 11:7 to 13:5. While the process stream passing from the MAC Recuperator 106 has been sufficiently heated, the return stream passing from the Cold Box 120 may not yet be heated. The RAC Recuperator 112 therefore recuperates at least a portion of the low-grade heat of compression from the RAC 114 back into the inlet of the RAC 114, thus increasing the outlet temperature of the RAC 114 and enabling high-grade heat of compression to be extracted from the outlet of the RAC 114. This also counteracts the cooling of the process stream after it has been supplemented by the return stream from the cold box 120.

The high-grade TESD 300 is configured to store the high-grade heat of compression embedded in the process stream as a result of its compression in the MAC 102 and the RAC 114. The high-grade heat is transferred to the high-grade TESD 300 from the process stream by the MAC HG HX 104, RAC HG HX 116 and the heat transfer fluid of the second arrangement of conduits. The high-grade TESD 300 may be a packed bed TESD, a stationary liquid phase-based TESD or preferably a two-reservoir TESD as described in the background section above. The heat transfer fluid may be a gas such as air or compressed air, or a liquid such as water, glycol, a mixture of water and glycol, thermal oil, a mixture of thermal oils or preferably molten salts.

As the process stream of liquefaction sub-system 100 is compressed in the MAC 102, it is embedded with high-grade heat of compression. It then passes through the MAC HG HX 104 where at least a portion of the high-grade heat of compression is transferred to the heat transfer fluid of the second arrangement of conduits. The heat transfer fluid is then pumped through the second arrangement of conduits to the high-grade TESD 300. In the high-grade TESD 300, the high-grade heat is transferred to a storage medium from the heat transfer fluid. The cool heat transfer fluid is then recirculated back to the MAC HG HX 104 or RAC HG HX 116 to repeat the heat transfer process.

In a similar process, as the process stream of liquefaction sub-system 100 is compressed in the RAC 114, it is embedded with high-grade heat of compression due to the recuperation of the process stream heat by the RAC Recuperator 112 as described above. The process stream then passes through the RAC HG HX 116 where at least a portion of the high-grade heat of compression is transferred to the heat transfer fluid of the second arrangement of conduits. The heat transfer fluid is then pumped through the second arrangement of conduits to the high-grade TESD 300. In the high-grade TESD 300, the high-grade heat is transferred to a storage medium. The cool heat transfer fluid is then pumped back to the MAC HG HX 104 or RAC HG HX 116 to repeat the heat transfer process. The storage medium of the high-grade TESD 300 may preferably be molten salt.

As described above, the process stream passing from the MAC Recuperator 106 to the RAC Recuperator 112 is supplemented by the return stream from the cold box 120 before it passes into the RAC Recuperator 112. Therefore, the mass flow through the RAC Recuperator 112 may be significantly higher than the mass flow through the MAC Recuperator 106. For example, the ratio of the mass flow rate through the RAC Recuperator 112 to the mass flow rate through the MAC Recuperator 106 may be between approximately 17:7 to 19:5. Generally, in heat exchangers, the rate of heat transfer is proportional to mass flow rate. As the mass flow of a fluid increases through a heat exchanger more molecules are able to interact with the internal surfaces of the heat exchanger and so more heat is able to conduct through its surface, enabling the heat exchanger to transfer more thermal energy. The increased mass flow rate through the RAC Recuperator 112 means that it can have significantly more heat available to exchange than the MAC Recuperator 106 and so can play a larger role in heating the process stream prior to it entering the RAC 114. Therefore, the MAC Recuperator 106 may be removed in favour of keeping only the RAC Recuperator 112.

Figure 3:
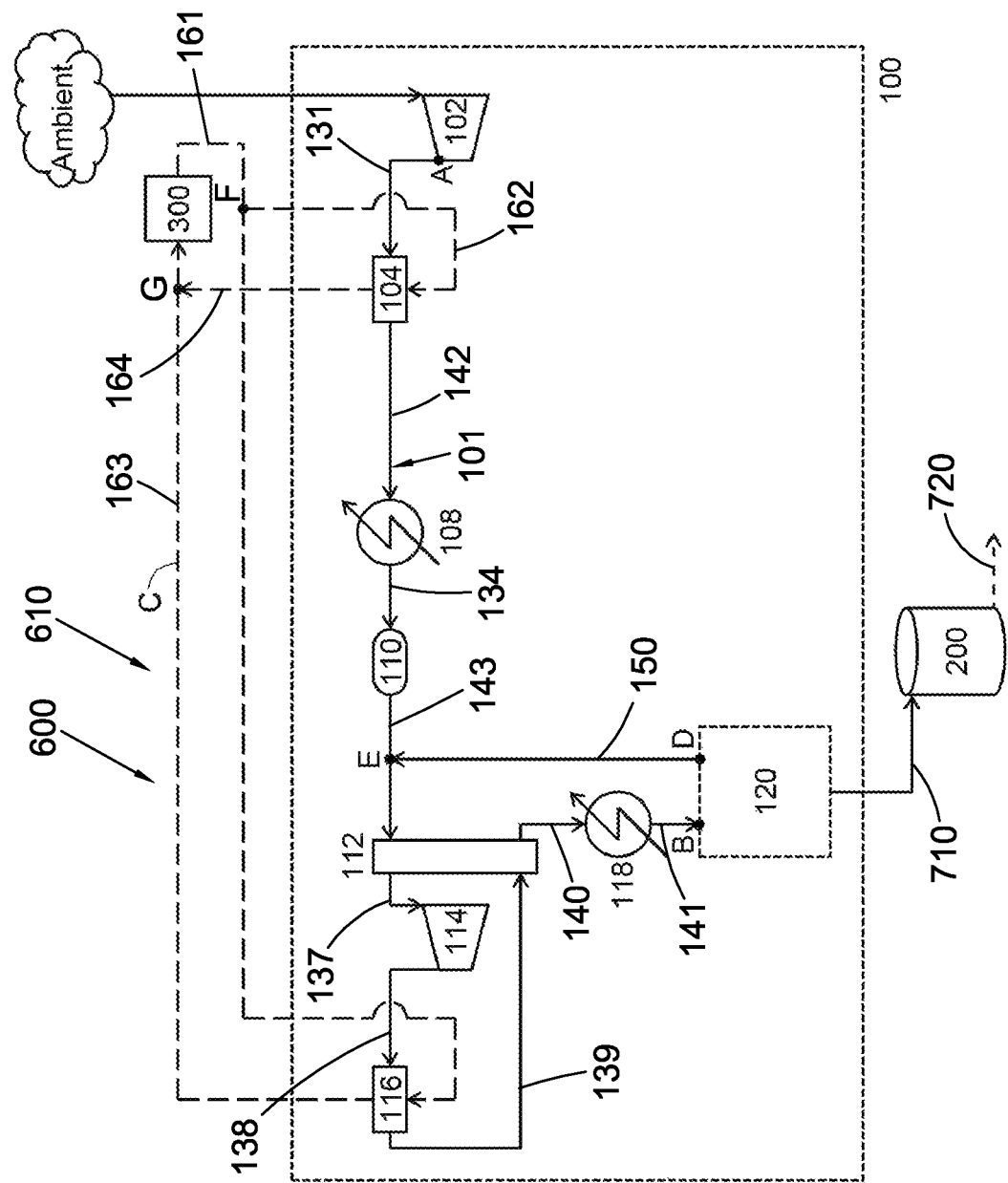
FIG. 3 is a detailed schematic illustration of a CES system, in particular an alternative liquefaction sub-system.

FIG. 3 illustrates a CES system which is identical to the CES system of FIG. 2 except that it lacks an MAC Recuperator 106. This modification can increase the simplicity of the liquefaction sub-system as well as reduce capital expenditure for building such a system.

The CES system comprises a liquefaction sub-system 100 and a high-grade TESD 300. The liquefaction sub-system 100 may similarly comprise a main air compressor (MAC) 102, a main air compressor high-grade heat exchanger (MAC HG HX) 104, a main air compressor air conditioner (MAC AC) 108, an air purification unit (APU) 110, a recycle air compressor recuperator heat exchanger (RAC Recuperator) 112, a recycle air compressor (RAC) 114, a recycle air compressor high-grade heat exchanger (RAC HG HX) 116, a recycle air compressor air conditioner (RAC AC) 118, a cold box 120, a first arrangement of conduits, a second arrangement of conduits and a third arrangement of conduits in a similar configuration to the CES system of FIG. 2. However in the present CES system, the MAC Recuperator 106 has been removed and the process stream passing from the MAC HG HX 104 passes to the MAC AC 108 and the process stream passing from the APU 110 passes to the RAC Recuperator 112.

The CES system of FIG. 3 includes the same first arrangement of liquefaction conduits as FIG. 2 except the second conduit 132 and the third conduit 133 are replaced by a twelfth conduit 142 connecting the MAC HG HX 104 directly to the APU 110 and the fifth conduit 135 and the sixth conduit 136 are replaced by a thirteenth conduit 143 connecting the APU 110 directly to the RAC Recuperator 112.

The MAC HG HX 104 is configured to transfer the high-grade heat of compression embedded in the process stream as a result of its compression in the MAC 102 to the heat transfer fluid of the second arrangement of conduits. The process stream is then passed directly to the MAC AC 108. However, the process stream received by the MAC AC 106 may still be embedded with the residual low-grade heat of compression. It is understood that the APU 110 operates optimally when the process stream is at approximately ambient temperature. Therefore, the MAC AC 108 may be configured to dump the excess heat into the atmosphere to cool the process stream to approximately ambient temperature. Alternatively, the MAC AC 108 may be configured to transfer at least a portion of the residual low-grade heat of compression to another system (e.g., any part of the power recovery sub-system, liquefaction sub-system or other part of the broader CES system) co-located to, or part of, the current CES system. As a further alternative, the MAC AC 108 may transfer at least a portion of the residual low-grade heat of compression to an external process or system that requires additional heat (e.g., heating facilities, boilers, air-conditioners, etc.).

The APU 110 receives the process stream from the MAC AC 108 and is configured to purify the process stream by removing water and $CO_2$. The process stream is then passed from the APU 110 to the RAC Recuperator 112. The process stream leaving the APU 110 may be at approximately ambient temperature and since the process stream is not passed through an MAC Recuperator 106, it may not be embedded with the residual low-grade heat of compression from the MAC 102.

Downstream of the APU 110, along the first arrangement of conduits, the RAC Recuperator 112 receives the process stream passing from the APU 110 as well as the process stream passing from the RAC HG HX 116. The RAC Recuperator 112 is configured to transfer at least a portion of the low-grade heat of compression from the process stream passing from the RAC HG HX 116 (described below) to the process stream passing from the APU 110. The process stream passing from the APU 110 is heated in the RAC Recuperator 112 and then passed to the RAC 114, whereas the process stream passing from the RAC HG HX 116 is cooled in in the RAC Recuperator 112 and then passed to the RAC AC 118. The remaining components of the CES system perform similar operations to those of the CES system illustrated in FIG. 2 and described above.

The return stream passing from the cold box 120 joins the process stream downstream of the APU 110. As noted above, the return stream may be at approximately ambient temperature. The process stream passing from the APU 110 may also be at approximately ambient temperature. Therefore, the RAC Recuperator 112 may be configured to transfer sufficient thermal energy to the process stream after it has been supplemented by the return stream to ensure it is embedded with high-grade thermal energy after compression in the RAC 114.

As described above, the return stream from the cold box 120 may have a mass flow rate significantly higher than the process stream passing from the MAC Recuperator 106 in the CES system of FIG. 2 or the APU 110 in the CES system of FIG. 3. Furthermore, the return stream may be at approximately ambient temperature. However, in the CES system of FIG. 2 in particular, the process stream passing from the MAC Recuperator may be much hotter, at approximately 190° C. Therefore when the process stream is supplemented by the return stream, there is a risk of significant thermal mixing of streams at different temperatures. This may result in a reduction in the energy potential of the process stream.

Figure 4:
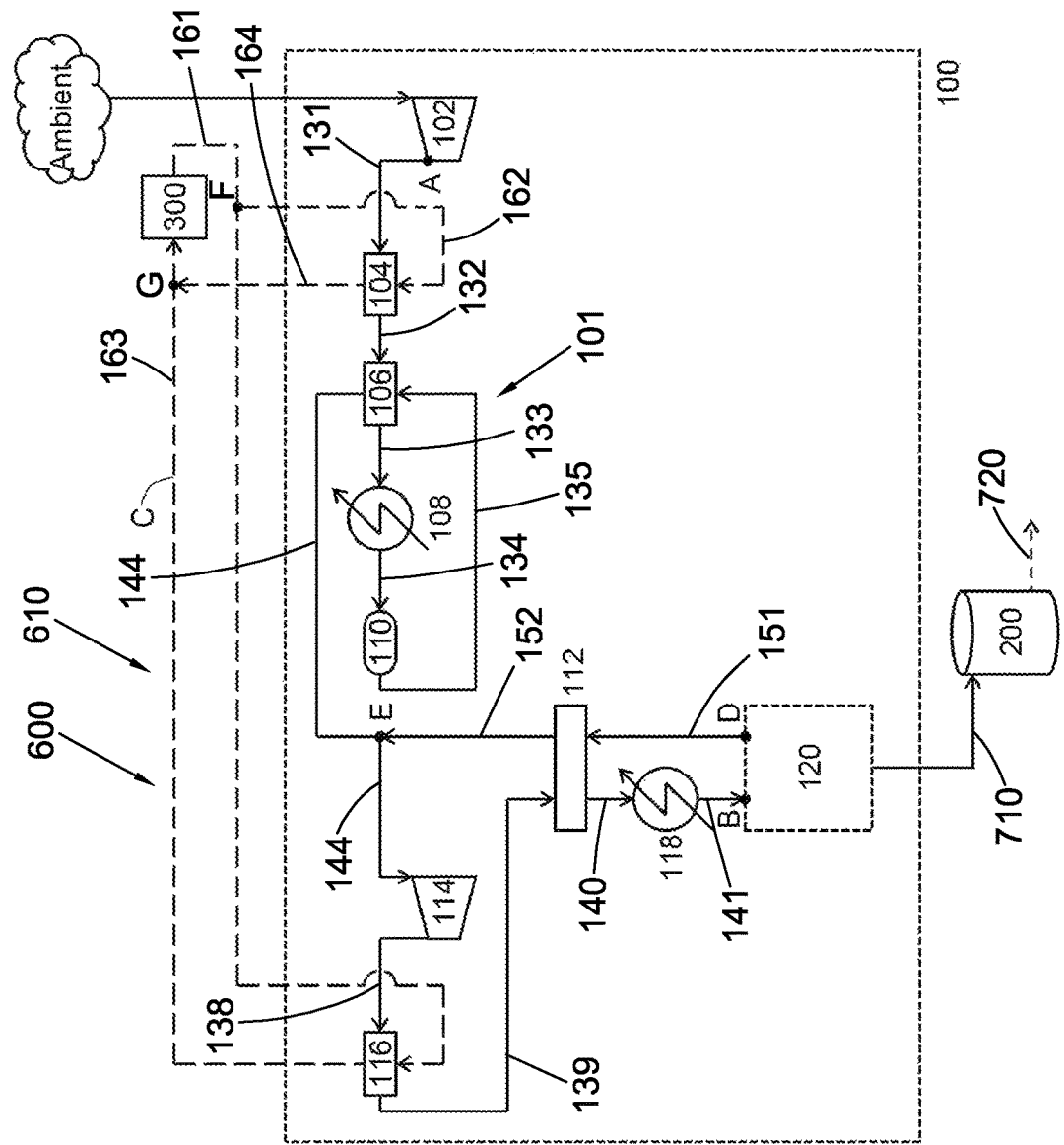
FIG. 4 is a detailed schematic illustration of a CES system, in particular a further alternative liquefaction sub-system.

FIG. 4 illustrates a CES system which is identical to the CES system illustrated in FIG. 2 and described above except that the RAC Recuperator 112 is configured to transfer at least a portion of the low-grade heat of compression from the process stream leaving the RAC HG HX 116 to the return stream from the cold box 120 before it supplements the process stream passing from the MAC Recuperator 106 to the RAC 114. This arrangement allows the present system to heat the return stream from the cold box 120 up to the approximate temperature of the process stream. This in turn may avoid thermal mixing of streams at different temperatures and the issues caused described above.

The CES system of FIG. 4 includes the same first arrangement of liquefaction conduits as FIG. 2 except the sixth conduit 136 connecting the MAC Recuperator 106 to the RAC Recuperator 112, is replaced by a fourteenth conduit 144 connecting the MAC Recuperator 106 to the RAC 114. The fourteenth liquefaction conduit 144 includes the junction E connected to the third arrangement of liquefaction conduits. The third arrangement of liquefaction conduits 150 includes a first return conduit 151 connecting the cold store box 120 to the RAC Recuperator 112 and a second return conduit 152 connecting the RAC Recuperator 112 to the junction E.

The CES system comprises a liquefaction sub-system 100 and a high-grade TESD 300. The liquefaction sub-system 100 may similarly comprise a main air compressor (MAC) 102, a main air compressor high-grade heat exchanger (MAC HG HX) 104, a main air compressor recuperator heat exchanger (MAC Recuperator) 106, a main air compressor air conditioner (MAC AC) 108, an air purification unit (APU) 110, a recycle air compressor recuperator heat exchanger (RAC Recuperator) 112, a recycle air compressor (RAC) 114, a recycle air compressor high-grade heat exchanger (RAC HG HX) 116, a recycle air compressor air conditioner (RAC AC) 118, a cold box 120, a first arrangement of conduits, a second arrangement of conduits and a third arrangement of conduits in a similar configuration to the CES system illustrated in FIG. 2 and described above.

The process stream from the MAC recuperator 106, which may be embedded with low-grade heat of compression, is passed to the RAC 114. Before passing to the RAC 114 the process stream is supplemented by the return stream from the cold box 120. The process stream is then compressed in the RAC 114 and passed to the RAC HG HX 116 where the high-grade heat of compression is transferred to the high-grade TESD 300 via the heat transfer fluid of the second arrangement of conduits. The process stream is then passed to the RAC Recuperator 112.

The RAC Recuperator 112 is configured to receive the process stream passing from the RAC HG HX 116 as well as the return stream from the cold box 120 before it supplements the process stream passing from the MAC Recuperator 106 to the RAC 114. The RAC Recuperator 112 is configured to transfer at least a portion of the low-grade heat of compression of the process stream leaving the RAC HG HX 116 to the return stream. The return stream from the cold box 120 may be heated in RAC Recuperator 112 to the approximate temperature of the process stream passing from the MAC Recuperator 106 to the RAC 114. The process stream passing from the RAC HG HX 116 to the RAC Recuperator 112 may be cooled in the RAC Recuperator 112 then passed to the RAC AC 118 and follows the same onward process as described in relation to the CES system illustrated in FIG. 2 and described above. The return stream passing from the cold box 120 to the RAC Recuperator 112 is heated in the RAC Recuperator 112 then passed to the first arrangement of conduits upstream of the RAC 114 where it supplements the process stream passing from the MAC Recuperator 106 to the RAC 114.

The return stream from the cold box 120 is therefore embedded with at least a portion of the low-grade heat of compression in the RAC Recuperator 112. Since the process stream passing from the MAC Recuperator 106 to the RAC 114 is also embedded with at least a portion of the low-grade heat of compression in the MAC Recuperator 106, when these streams combine, they may not experience significant mixing at different temperatures. Furthermore, since both streams have been heated, when combined and compressed in the RAC 114, the process stream will be embedded with high-grade heat of compression. This enables the present system the transfer at least a portion of this high-grade heat to the high-grade TESD 300 through the RAC HG HX 116 and the seat transfer fluid of the second arrangement of conduits.

As previously noted, in the CES system of FIG. 4, the return stream from the cold box 120 can have a significantly higher mass flow rate than the process stream passing from the MAC 102. Therefore the RAC Recuperator 112 has significantly more energy to transfer than the MAC Recuperator 106, and as a result, has a larger role in determining the input temperature of the RAC 114 and the amount of high-grade heat of compression generated in the RAC 114. As such, the MAC Recuperator 106 may be removed in favour of keeping only the RAC Recuperator 112.

Figure 5:
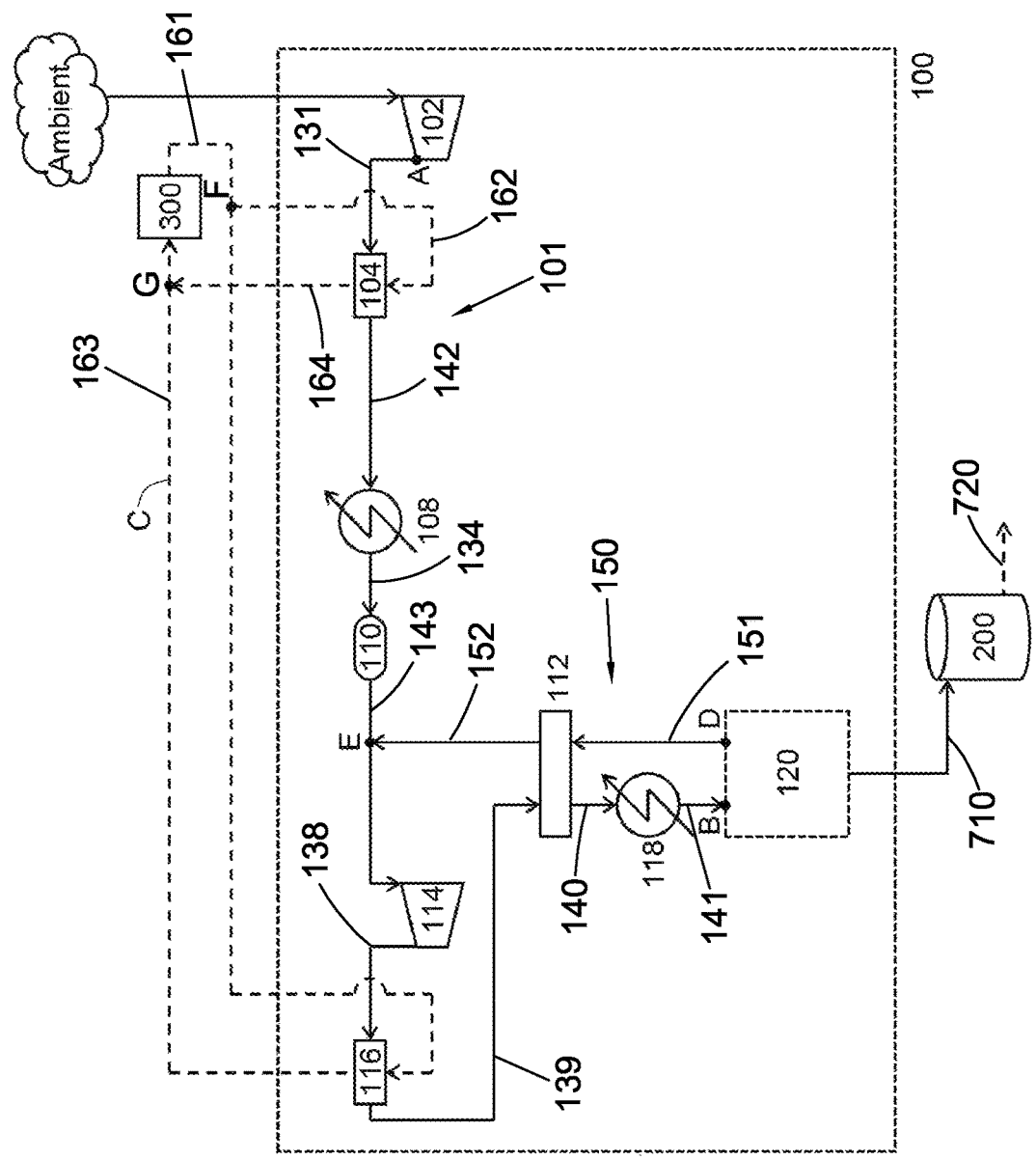
FIG. 5 is a detailed schematic illustration of a CES system, in particular a further alternative liquefaction sub-system.

FIG. 5 illustrates a CES system which is identical to the CES system of FIG. 4 except that this it lacks an MAC Recuperator 106. This modification can increase the simplicity of the liquefaction sub-system as well as reduce capital expenditure for building such a system.

The CES system comprises a liquefaction sub-system 100 and a high-grade TESD 300. The liquefaction sub-system 100 may similarly comprise a main air compressor (MAC) 102, a main air compressor high-grade heat exchanger (MAC HG HX) 104, a main air compressor air conditioner (MAC AC) 108, an air purification unit (APU) 110, a recycle air compressor recuperator heat exchanger (RAC Recuperator) 112, a recycle air compressor (RAC) 114, a recycle air compressor high-grade heat exchanger (RAC HG HX) 116, a recycle air compressor air conditioner (RAC AC) 118, a cold box 120, a first arrangement of conduits, a second arrangement of conduits and a third arrangement of conduits in a similar configuration to the CES system of FIG. 4. However, the MAC Recuperator 106 has been removed and the process stream passing from the MAC HG HX 104 passes directly to the MAC AC 108 and the process stream passing from the APU 110 passes directly to the RAC Recuperator 112.

The CES system of FIG. 5 includes the same first arrangement of liquefaction conduits as FIG. 4 except the second conduit 132 connecting the MAC HG HX 104 and the MAC Recuperator 106 and the third conduit 133 connecting the MAC Recuperator 106 to the MAC AC 108 are replaced by a twelfth conduit 142 connecting the MAC HG HX 104 directly to the APU 110 and the fifth conduit 135 connecting the APU 110 to the MAC Recuperator 106 and the sixth conduit 136 connecting the MAC Recuperator 106 to the RAC Recuperator 112 are replaced by a thirteenth conduit 143 connecting the APU 110 directly to the RAC Recuperator 112.

The process stream leaving the MAC HG HX 104 may be embedded with the residual low-grade heat of compression and is then passed to the MAC AC 108. The MAC AC 108 may be configured to dump the excess heat into the atmosphere to cool the process stream to approximately ambient temperature. Alternatively, the MAC AC 108 may be configured to transfer at least a portion of the residual low-grade heat of compression to another system (e.g., any part of the power recovery sub-system, liquefaction sub-system or other part of the broader CES system) co-located to, or part of, the current CES system. As a further alternative, the MAC AC 108 may transfer at least a portion of the residual low-grade heat of compression to an external process or system that requires additional heat (e.g., heating facilities, boilers, air-conditioners, etc.).

The APU 110 receives the process stream from the MAC AC 108 and is configured to purify the process stream by removing water and $CO_2$. The process stream is then passed from the APU 110 to the RAC 114. The process stream passing from the APU 110 may be at approximately ambient temperature since it is not passed through an MAC Recuperator 106 and does not receive the low-grade heat from the MAC 102. The process stream passing from the APU 110 is supplemented by the return stream from the cold box 120 before it is passed to the RAC 114. The remaining components of this CES system perform similar operations to those of the CES system of FIG. 4 as described above.

Downstream of the RAC HG HX 116, along the first arrangement of conduits, the RAC Recuperator 112 receives the process stream passing from the RAC HG HX 116 as well as the return stream passing from the cold box 120. The RAC Recuperator 112 is configured to transfer at least a portion of the low-grade heat of compression of the process stream downstream of the RAC HG HX 116 to the return stream from the cold box 120. The return stream leaving the cold box 120 and the process stream passing from the APU 110 may be at approximately ambient temperature. Therefore, the RAC Recuperator 112 may be configured to transfer sufficient thermal energy to the return stream before it supplements the process stream to ensure the process stream is embedded with high-grade thermal energy after compression in the RAC 114.

Figure 6:
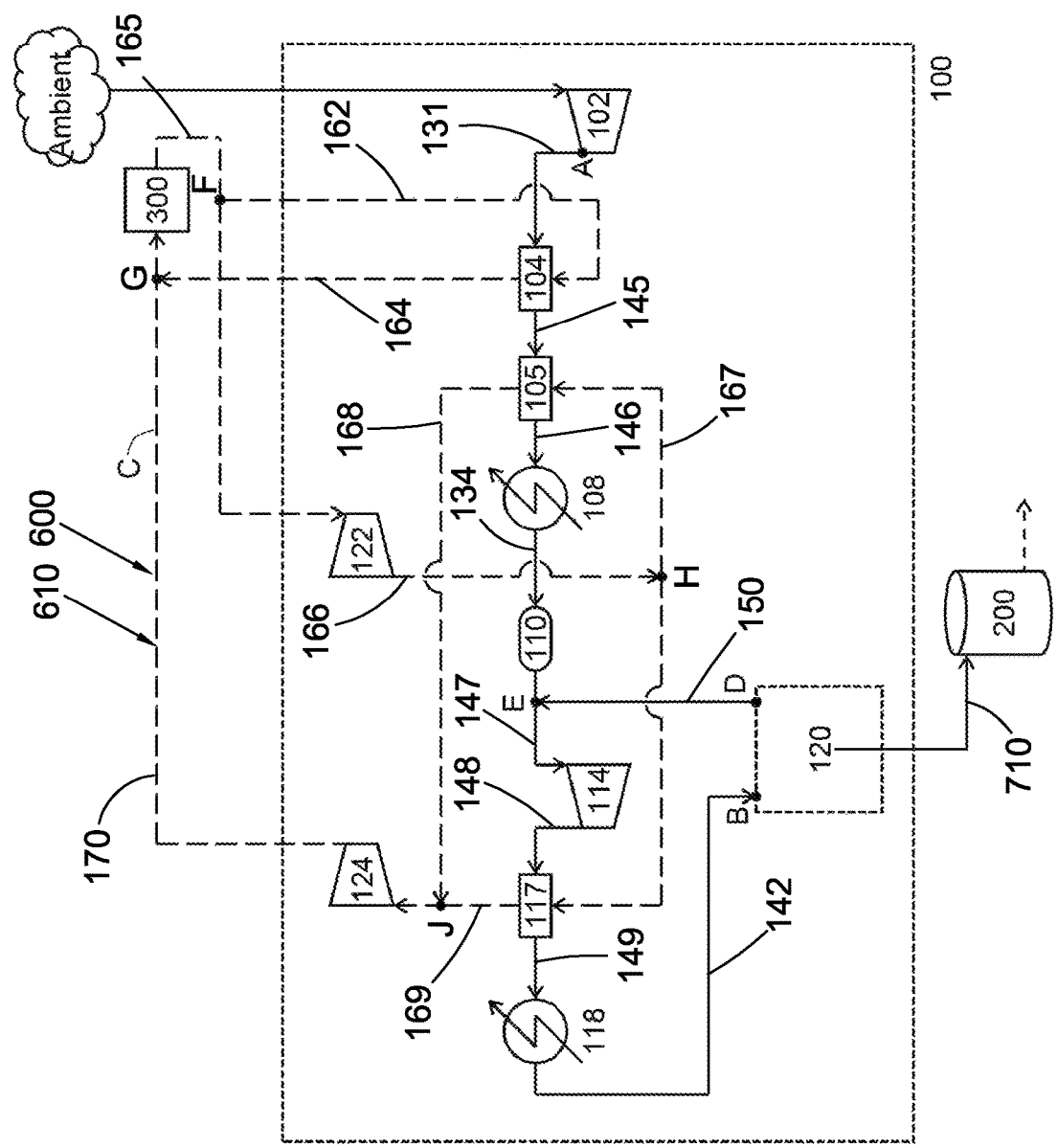
FIG. 6 is a detailed schematic illustration of a CES system, in particular the liquefaction sub-system, which makes use of expanders and compressors.

FIG. 6 illustrates a CES system comprising a liquefaction sub-system 100 and a high-grade TESD 300. The liquefaction sub-system 100 is configured to convert a stream of ambient air into liquid air, or cryogen, for storage in a cryogenic storage tank 200. The liquefaction sub-system 100 makes use of a compressor and expander to raise or lower the temperature of the heat transfer fluid so that the low-grade heat of compression from the process stream can be captured directly and stored as high-grade heat in the high-grade TESD 300.

The liquefaction sub-system 100 may comprise a main air compressor (MAC) 102, a main air compressor high-grade heat exchanger (MAC HG HX) 104, a main air compressor low-grade heat exchanger (MAC LG HX) 105, a main air compressor air conditioner (MAC AC) 108, an air purification unit (APU) 110, a recycle air compressor (RAC) 114, a recycle air compressor low-grade heat exchanger (RAC LG HX) 117, a recycle air compressor air conditioner (RAC AC) 118 and a cold box 120. The CES system may further comprise a heat transfer fluid expander (HTF Expander) 122 and a heat transfer fluid compressor (HTF Compressor) 124. The HTF Expander 122 and HTF Compressor 124 may be comprised within the liquefaction sub-system 100 or separate from the liquefaction sub-system 100. The CES system may further comprise the cryogenic storage tank 200.

The liquefaction sub-system 100 may further comprise a first arrangement of conduits, having an upstream end and a downstream end and configured to pass the process stream of the liquefaction sub-system 100 from the MAC 102 going through the MAC HG HX 104, the MAC LG HX 105, the MAC AC 108, the APU 110, the RAC 114, the RAC LG HX 117, the RAC AC 118, and to the cold box 120. The first arrangement of conduits is indicated by the line AB in FIG. 6 where the upstream end is at point A, and the downstream end is at point B. The CES system may further comprise a second arrangement of conduits forming a closed circuit and configured to pass a heat transfer fluid between the high-grade TESD 300, the MAC HG HX 104, the HTF Expander 122, the MAC LG HX 105, the RAC LG HX 117 and the HTF Compressor 124. The second arrangement of conduits is indicated by closed circuit C in FIG. 6. The liquefaction sub-system 100 may further comprise a third arrangement of conduits, having an upstream end and a downstream end, and configured to pass a second process stream, herein referred to as a return stream, from the cold box 120 to supplement the process stream of the first arrangement of conduits upstream of the RAC 114. The third arrangement of conduits is indicated by the line DE in FIG. 2 where the upstream end is at point D, and the downstream end is at point E.

The first arrangement of conduits 101 of the CES of FIG. 6 includes liquefaction conduits fluidly connected as follows: a first conduit 131 is connected to the MAC 102 and the MAC HG HX 104, a fifteenth conduit 145 connected to the MAC HG HX 104 and the MAC LG HX 105, a sixteenth conduit 146 connected to the MAC LG HX 105 and the MAC AC 108, a fourth conduit connected to the MAC AC 108 and the APU 110, a seventeenth conduit connected to the APU 110 to the RAC 114 and including the junction E, an eighteenth conduit connecting the RAC 114 to the RAC LG HX 117, a nineteenth conduit 149 is connected to the RAC LG HX 117 and the RAC AC 118, and a twelfth conduit 142 is connected to the RAC AC 118 and the cold box 120.

The second arrangement of Heat transfer conduits 610 of the CES of FIG. 6 includes heat transfer conduits fluidly connected as follows: a fifth conduit 165 includes the junction F and is connected to the high-grade TESD 300 and the HTF Expander 122, a sixth conduit 166 connects the HTF Expander 122 and a junction H in a seventh conduit 167, the seventh conduit 167 connects the MAC LG HX 105 and the RAC LG HX 117 and includes the junction H, an eighth conduit 168 connects the MAC LG HX 105 and a junction J in a ninth conduit 169, the ninth conduit 169 is connected to the RAC LG HX 117 and the HTF Compressor 124 and includes the junction J, and a tenth conduit 170 includes the junction G and connects the HTF Compressor 124 and the high-grade TESD 300. It will be understood that as for FIGS. 2-5 the connections of the second conduit 162 and the fourth conduit 164 could be directly to the high-grade TESD 300 in place of to junctions F and G respectively.

During the charging phase of the CES system, the MAC 102 compresses ambient air (i.e. air present in the atmosphere surrounding the CES system) from ambient air pressure to a first pressure, which may be approximately between two bar to tens of bar. As the ambient air is compressed it is significantly heated, its temperature may raise from ambient temperature to above approximately 400° C. depending on the ambient conditions as it is embedded with heat of compression. At such temperatures the process stream is embedded with high-grade heat of compression.

Downstream of the MAC 102 along the first arrangement of conduits, the MAC HG HX 104 receives the hot compressed process stream from the MAC 102. The MAC HG HX 104 also receives a stream of heat transfer fluid from the second arrangements of conduits. The MAC HG HX 104 is configured to transfer at least a portion of the high-grade heat of compression of the process stream to the heat transfer fluid. As a result, the process stream may be cooled to approximately 180-220° C., therefore the process stream may still be embedded with the residual low-grade heat of compression.

Downstream of the MAC HG HX 104 along the first arrangement of conduits, the MAC LG HX 105 receives the process stream from the MAC HG HX 104. The MAC LG HX 105 also receives a stream of heat transfer fluid from the second arrangements of conduits downstream of the HTF Expander 122 (described below). The MAC LG HX 105 is configured to transfer at least a portion of the residual low-grade heat of compression of the process stream to the heat transfer fluid of the second arrangement of conduits upstream of the HTF Compressor 124 (described below). The heat transfer fluid, now embedded with low-grade heat of compression from the MAC 102, then passes to the HTF Compressor 124 (described below) through the second arrangement of conduits.

Downstream of the MAC LG HX 105 along the first arrangement of conduits, the MAC AC 108 receives the process stream from the MAC LG HX 105 and is configured to remove the final heat of compression from the process stream. The cooling provided by the MAC AC 108 determines the final temperature of the process stream before being passed to the APU 110, and therefore determines the inlet temperature for the APU 110. The MAC AC 108 may cool the process stream down to approximately ambient temperature. The MAC AC 108 may also remove a significant portion of the moisture from the process stream due to condensation.

Downstream of the MAC AC 108, along the first arrangement of conduits, the APU 110 receives the process stream from the MAC AC 108 and is configured to purify the process stream by removing water and $CO_2$ which would otherwise freeze and block the liquefaction sub-system during operation. The APU 110 may purify the process stream through molecular adsorption, Temperature Swing Adsorption (TSA), Pressure Swing Adsorption (PSA), or a combination of both. Specific adsorbents may be employed within the APU that preferentially remove the $CO_2$ and water from the process stream. The process stream may leave the APU 110 at approximately ambient temperature or slightly above due to possible exothermic processes in the APU 110.

Downstream of the APU 110, the process stream is supplemented by the return stream from the cold box 120 similar to the CES systems of FIGS. 2 through 5. The return stream from the cold box 120 may be at a moderately low temperature, around ambient temperature. Additionally, the return stream from the cold box 120 typically has a much larger mass flow than the process stream from the outlet to the APU 110.

Downstream of the APU 110, along the first arrangement of conduits, the RAC 114 receives the process stream passing from the APU 110 after it has been supplemented by the return stream. During the previously described stages the pressure of the process stream may drop slightly, however, the RAC 114 may compress the process stream from approximately the first pressure (accounting for any pressure drops) to a second pressure, which may be approximately several tens of bar. As the process stream is compressed its temperature significantly increases as heat of compression is generated. Compared to the CES systems of FIGS. 2 through 5, the inlet temperature of the RAC 114 may be approximately ambient temperature, and since the pressure ratio of the RAC 114 is lower than the MAC 102, the outlet temperature may be approximately <190° C. Therefore, the process stream leaving the RAC 114 may only be embedded with low-grade heat of compression.

Downstream of the RAC 114, along the first arrangement of conduits, the RAC LG HX 117 receives the process stream from the RAC 114. The RAC LG HX 117 also receives a stream of heat transfer fluid from the second arrangements of conduits downstream of the HTF Expander 122 (described below). The RAC LG HX 117 is configured to transfer at least a portion of the low-grade heat of compression of the process stream to the heat transfer fluid of the second arrangement of conduits upstream of the HTF Compressor 124. The heat transfer fluid, now embedded with the low-grade heat of compression from the RAC 114, then passes to the HTF Compressor 124 (described below) through the second arrangement of conduits.

Downstream of the RAC LG HX 117, along the first arrangement of conduits, the RAC AC 118 receives the process stream passing from the RAC LG HX 117. The RAC AC 118 is configured to remove the residual heat of compression from the process stream before it is passed to the cold box 120. The RAC AC 118 may cool the process stream down to approximately ambient temperature.

Downstream of the RAC AC 118 along the first arrangement of conduits, the cold box 120 receives the process stream passing from the RAC AC 118. The cold box 120, as described in the background section above, is configured to cool the process stream until it substantially condenses to liquid. At least a portion of the liquid product is separated from the vapour phase and passed to the cryogenic storage tank 200 for later use. At least a portion of the vapour phase (i.e., any non-liquefied process stream) may to used cool the process stream entering the cold box 120 to aid liquefaction. This is done by passing the vapour phase through the cold box 120 in a counter-flow direction to the process stream entering the cold box 120. The return stream is formed of the vapour phase after it has been passed through the cold box 120 and is passed through the third arrangement of conduits to supplement the process stream upstream of the RAC 114.

As described above, the MAC HG HX 104 is configured transfer at least a portion of the high-grade heat of compression from the process stream to the heat transfer fluid. The heat transfer fluid is then pumped through the second arrangement of conduits to the high-grade TESD 300. The MAC LG HX 105 and RAC LG HX 117 on the other hand are configured transfer at least a portion of the residual low-grade heat of compression from the process stream to the heat transfer fluid. The heat transfer fluid is then pumped through the second arrangement of conduits to the HTF Compressor 124.

The HTF Compressor 124 is configured to receive the heat transfer fluid from both the MAC LG HX 105 and the RAC LG HX 117. The HTF Compressor 124 then compresses the heat transfer fluid, which may raise its temperature to approximately that of the high-grade TESD 300 and/or that of the heat transfer fluid passing from the MAC HG HX 104. As a result of the generation of additional heat of compression, the heat transfer fluid passing from the HTF Compressor 124 may be embedded with high-grade heat of compression. The heat transfer fluid is then pumped through the second arrangement of conduits to the high-grade TESD 300.

The high-grade TESD 300 may be configured to store the high-grade heat of compression embedded in the heat transfer fluid in a storage medium. The storage medium of the high-grade TESD 300 may preferably be molten salt. The high-grade TESD 300 may be a packed bed TESD, a stationary liquid phase-based TESD or preferably a two-reservoir TESD as described in the background section above. The heat transfer fluid may preferably be gas or compressed gas. In the high-grade TESD 300, the high-grade heat of compression embedded in the heat transfer fluid is transferred to the storage medium from the heat transfer fluid. The cool heat transfer fluid is then recirculated back to MAC HG HX 104 and/or HTF Expander 122. As described above, the MAC HG HX 104 is configured to receive at least a portion of the cooled heat transfer fluid and to transfer at least a portion of the high-grade heat of compression from the process stream generated from its compression in the MAC 102 to the heat transfer fluid.

The HTF Expander 122 is configured to receive at least a portion the cool heat transfer fluid passing from the high-grade TESD 300. The heat transfer fluid passing from the high-grade TESD 300 may still have a relatively high temperature compared to the process stream passing from the MAC HG HX 104 or the RAC 114. The HTF Expander 122 may therefore expand the heat transfer fluid, which cools the heat transfer fluid and also allows work to be extracted from the expanding heat transfer fluid. The HTF Expander 122 may be mechanically coupled to a generator for generating electricity. The heat transfer fluid is then passed to the MAC LG HX 105 and the RAC LG HX 117, for receiving the low-grade heat of compression from the process stream as described above.

For compressors in general, as the inlet fluid temperature increases the amount of work required to compress the fluid also increases due to the higher internal kinetic energy of the fluid molecules. In the present CES system, the inlet fluid temperature of the RAC 114 may be much lower than the CES systems of FIGS. 2 through 5, at approximately ambient temperatures rather than approximately 200° C. Therefore the RAC 114 of the present CES system requires less work to compress the process stream, this means the RAC 114 for this system may last longer due to the reduced workload and/or a cheaper compressor type or model may be sourced for the RAC 114 which can lower capital expenditure.

In a similar manner to the CES systems of FIGS. 3 and 5, the MAC LG HX 105 may be removed (not shown in a figure). In this case, the MAC HG HX 104 passes the process stream directly to the MAC AC 108. The MAC AC 108 may be configured to dump the excess heat into the atmosphere to cool the process stream to approximately ambient temperature. Alternatively, the MAC AC 108 may be configured to transfer at least a portion of the residual low-grade heat of compression to another system (e.g., any part of the power recovery sub-system, liquefaction sub-system or other part of the broader CES system) co-located to, or part of, the current CES system. As a further alternative, the MAC AC 108 may transfer at least a portion of the residual low-grade heat of compression to an external process or system that requires additional heat (e.g., heating facilities, boilers, air-conditioners, etc.).

Figure 7:
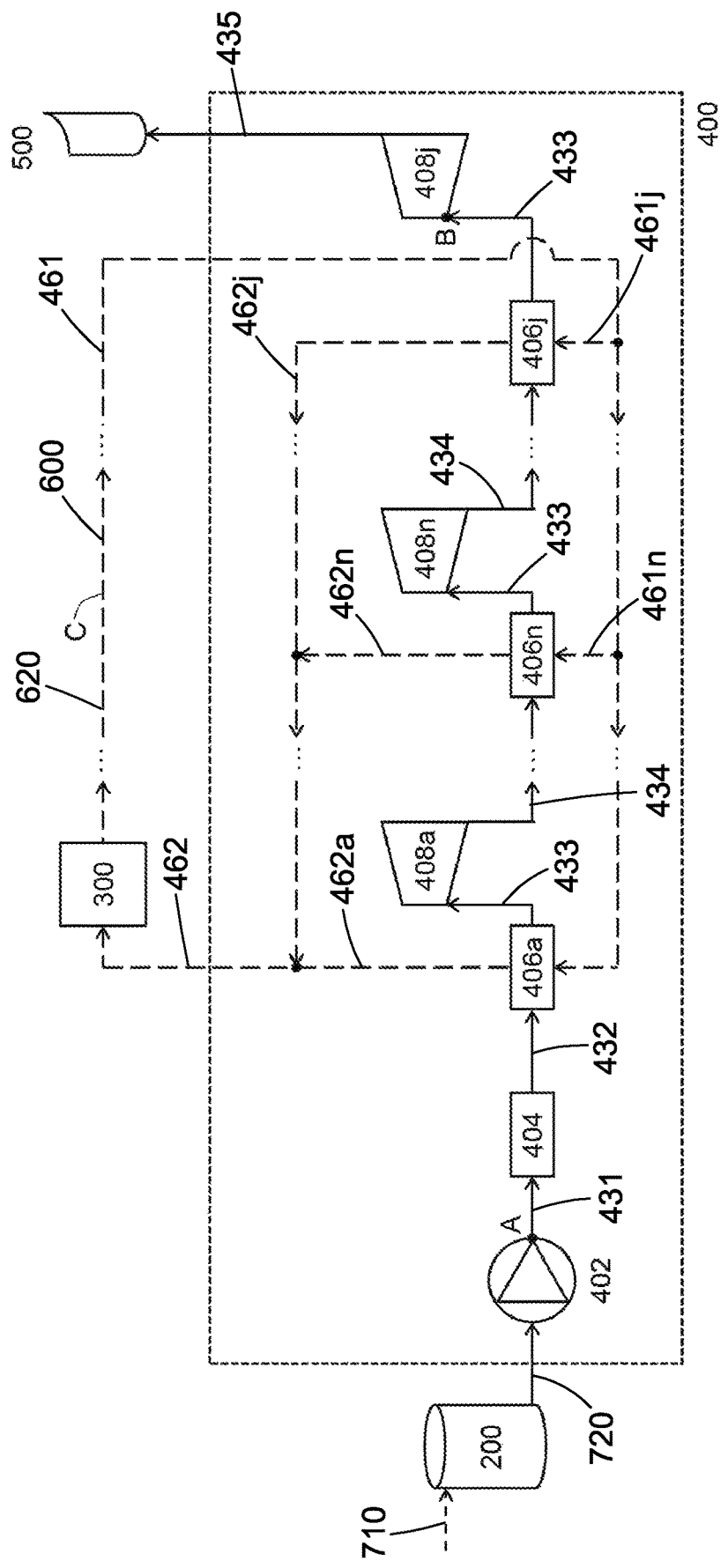
FIG. 7 is a detailed schematic illustration of a CES system, in particular the power recovery sub-system.

FIG. 7 illustrates a CES system comprising a power recovery sub-system 400 and a high-grade TESD 300. The power recovery sub-system 400 is configured to vaporise, heat, and expand a working fluid to extract work therefrom. The power recovery sub-system 400 may comprise a cryogenic pump 402, an evaporator 404, at least one heater 406 and at least one expansion stage 408. The CES system may further comprise a vent 500 and a cryogenic storage tank 200.

The at least one heater is represented in FIG. 7 by several heaters 406a, 406n, and 406j and the at least one expansion stage is represented by several expansion stages 408a, 408n, and 408j. The different heaters and expansion stages illustrated in FIG. 7 demonstrate the possible fluid connections of possible heaters and expansion stages. Heater 406a represents a first heater, heater 406n represents an intermediate heater and heater 406j represents a final heater. Expansion stage 408a represents a first expansion stage, expansion stage 408n represents an intermediate expansion stage and expansion stage 408j represents a final expansion stage. Each expansion stage of the at least one expansion stage is located downstream of a corresponding heater. The power recovery sub-system 400 preferably comprises four heaters and with an expansion stage downstream of each.

The power recovery sub-system 400 may further comprise a first arrangement of power recovery conduits 401 configured to pass a working fluid of the power recovery unit 400 from the pump 402 going through the evaporator 404 and each of the at least one heater 406 and corresponding expansion stage 408 to the final expansion stage 408j. The first arrangement of conduits is indicated by the line AB in FIG. 7 where the upstream end is at point A, and the downstream end is at point B.

The first arrangement of power recovery conduits 401 may include the following fluidly connected power recovery conduits: a first conduit 431 connected to the pump 402 and the evaporator 404, a second conduit 432 connected to the evaporator 404 and at least one of the at least one heater 406n, one or more third conduits 433 connected between each of the at least one heater 406n and the corresponding expansion stage 408n, one or more fourth conduits 434 connected to each of the at least one expansion stage 408n to the next of the at least one heater 406n+1 if included and a fifth conduit 435 connected to the final expansion stage 408j and to the vent 500. It will be understood that there could be any number of heaters 406n an expansion stages 408n and j does not indicate a maximum or required number of stages.

The CES system may further comprise a second arrangement of heat transfer conduits 620, 600 forming a closed circuit and configured to pass a heat transfer fluid between the high-grade TESD 300 and each of the at least one heater 406. The second arrangement of conduits is indicated by closed circuit C in FIG. 7 as in FIG. 2.

The second arrangement of heat transfer conduits 620, 600 includes heat transfer conduits fluidly connected as follows: one or more first conduits 461 each connected to the high-grade TESD 300 and each of the at least one heaters 406 and one or more second conduits 462 each connected to the at least one heaters 406 and the high-grade TESD 300.

During the discharging phase of the CES system, the cryogenic pump 402 is configured to extract a stream of liquid product from the storage tank 200, such as the cryogen or liquid air, and to pressurise said stream, forming the working fluid. The pump 200 is configured to control the flow of cryogen withdrawn from the storage tank 200.

Downstream of the pump 402, along the first arrangement of conduits, the evaporator 404 is configured to receive the working fluid from the pump 402 and substantially or entirely vaporise the working fluid.

Downstream of the evaporator 404, along the first arrangement of conduits, the first heater 406a of the at least one heater 406 receives the working fluid from the evaporator 404. The first heater 406a is also receives the heat transfer fluid from the high-grade TESD 300 via the second arrangement of conduits. The heat transfer fluid passing from the high-grade TESD 300 may be embedded with high-grade heat originating from the liquefaction sub-system 100. The first heater 406a is configured to transfer at least a portion of the high-grade heat from the heat transfer fluid to the working fluid.

Downstream of the first heater 406a, along the first arrangement of conduits, the first expansion stage 408a of the at least one expansion stage 408 receives the working fluid from the first heater 406a. The first expansion stage 408a is configured to expand the working fluid and to extract work therefrom. The first expansion stage 408 may be mechanically coupled an electric generator (not shown) which converts the mechanical energy to electrical energy.

In the case where there is more than one heater and expansion stage, downstream of the first expansion stage 408a, a second heater 406n receives the working fluid from the first expansion stage 408a and a second expansion stage 408n receives the working fluid from the second heater 406n. The second heater 406n and expansion stage 408n may perform the same process of heating and expanding the working fluid as the first heater and first expansion stage as described above. This also applies to any number of heaters and corresponding expansion stages. Namely, each heater 406 is configured to transfer the high-grade heat from the heat transfer fluid to the working fluid, and each expansion stage 408 is configured to expand the working fluid to generate mechanical energy that can be used to generate electrical energy. Each expansion stage 408 may be coupled to a common shaft which may be ultimately mechanically coupled to a common electric generator, this allows each the expansion stage 408 to contribute to the electrical energy generated in the generator.

Downstream of the final expansion stage 408j (which may be the first expansion stage as noted above), along the first arrangement of conduits, the exhaust from the final expansion stage 408j may be exhausted into atmosphere through the vent 500 or recycled into another part of the CES system (e.g. liquefaction sub-system, TESD, etc.) or another system (e.g. refrigeration system, air-conditioning system, air liquefier, etc.) co-located to the current CES system.

The high-grade TESD 300 may be configured to store, in a storage medium, the high-grade heat of compression generated in the process stream of the liquefaction sub-system 100 during the charging phase as described in relation to the CES systems of FIGS. 2 through 5. The storage medium of the high-grade TESD 300 may preferably be molten salt. The high-grade TESD 300 may be a packed bed TESD, a stationary liquid phase-based TESD or preferably a two-reservoir TESD as described in the background section above. The heat transfer fluid of the second arrangement of conduits may be a gas such as air or compressed air, or a liquid such as water, glycol, a mixture of water and glycol, thermal oil, a mixture of thermal oils or preferably molten salts. In high-grade TESD 300 during the discharging phase, the high-grade heat embedded in the storage medium is transferred to the heat transfer fluid of the second arrangement of conduits. The heat transfer fluid is then distributed to each heater 406 in which the high-grade heat is transferred to the working fluid before the working fluid is expanded in each corresponding expansion stage 408.

In general, the power generated by an expansion turbine is a function of the pressure ratio across the turbine, the mass flow rate through the turbine and the inlet temperature. In power recovery systems of known in the art (for example WO2019158921A1 described in the background section above), some expansion stages of the power recovery sub-system are specified to generate power from the working fluid heated by the low-grade heat of compression, whereas some expansion stages are specified to generate power from the working fluid heated by the high-grade heat of compression. This means that at least some of the expansion stages operate at a lower temperature and therefore a lower specific output.

On the other hand, the expansion turbines 408 of the present CES system may all be configured to generate power from the working fluid heated by the high-grade heat of compression from the high-grade TESD 300. This means the inlet temperature of the expansion turbines may be higher, so they may operate at a higher temperature and can extract more work from the hotter working fluid, resulting in a higher specific output. This means that the present CES system operates at a higher average temperature and, therefore, is more energy dense meaning it can produce more energy per unit of working fluid. Furthermore, building and maintaining a CES plant with expansion stages that operate at similar temperatures allows for more efficient construction, easier maintenance and lower capital expenditure due to the ability to procure all expansion turbines of the same, similar or comparable specifications. This leads to a simplification of the system and may result in an overall reduction in plant component cost.

Figure 8:
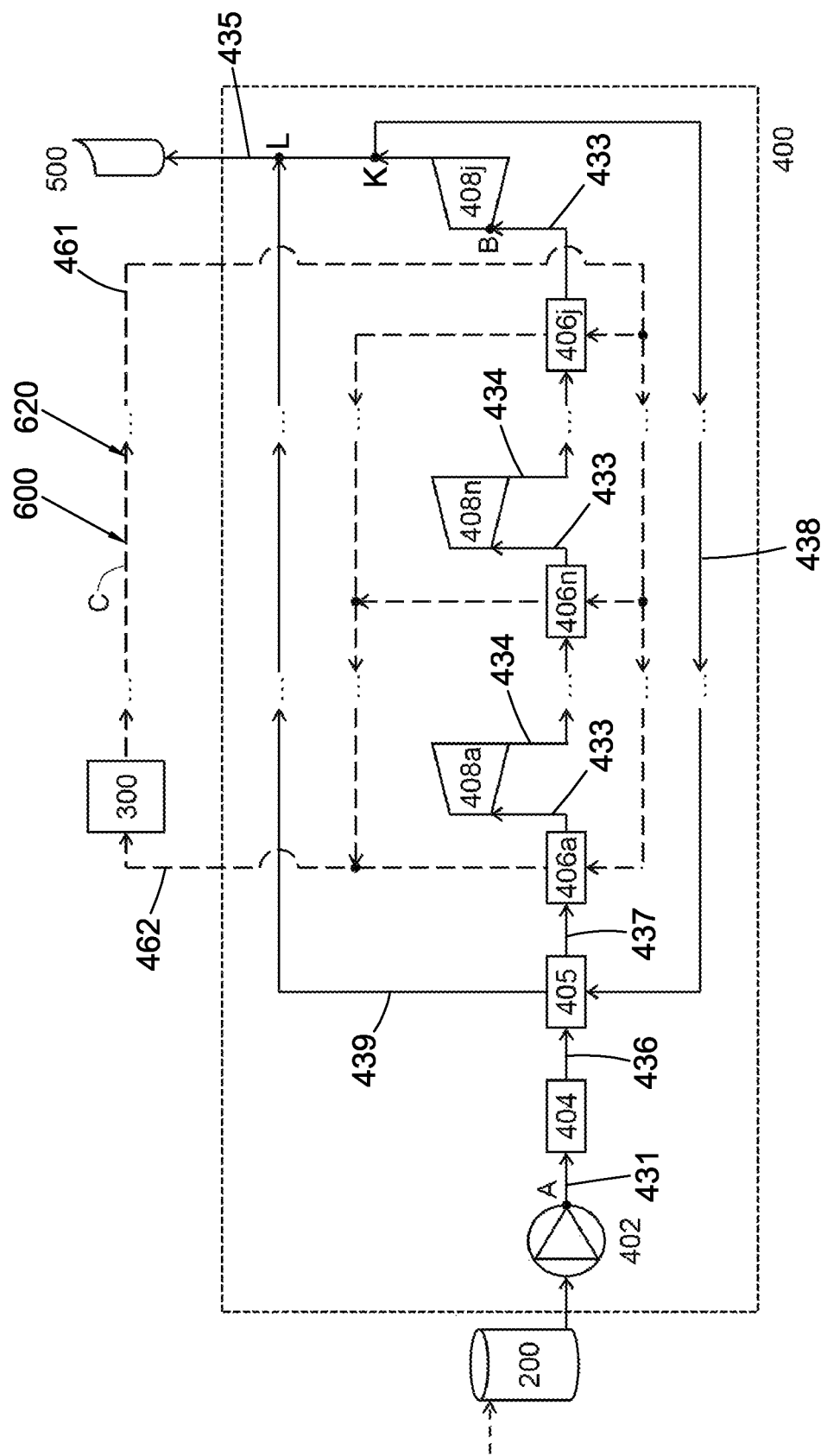
FIG. 8 is a detailed schematic illustration of a CES system, in particular an alternative power recovery sub-system.

FIG. 8 illustrates a CES system which is identical to the CES system of FIG. 7 except that the power recovery sub-system 400 further comprises a pre-heater 405 configured to transfer at least a portion of the heat from the exhaust of the final expansion turbine 408j back into the working fluid prior to its heating in the first heater 406a.

Therefore the CES of FIG. 8 includes the same power recovery conduits 401 as the CES of FIG. 7 with the exception that the fifth conduit 435 further includes junctions K and L, the second conduit 432 of FIG. 7 is replaced by a sixth conduit 436 connected to the evaporator 404 and the pre-heater 405 and a seventh conduit 437 connected to the evaporator 404 and the first heater 406a, an eight conduit 438 connected to the junction K and the pre-heater 405 and a ninth conduit 439 connected to the pre-heater 405 and the junction L. Preferably the junction L is down stream of the junction K in the fifth conduit 435. It will be understood that any connection to junction K could also be connected to final expansion stage 408j and any connection to junction L could be connected directly to vent 500.

The CES system comprises a power recovery sub-system 100 and a high-grade TESD 300. The power recovery sub-system 400 may similarly comprise a cryogenic pump 402, an evaporator 404, at least one heater 406, at least one expansion stage 408, a first arrangement of conduits and a second arrangement of conduits in a similar configuration to the CES system of FIG. 7. The CES system may also further comprise a vent 500 and a cryogenic storage tank 200.

Downstream of the evaporator 404, along the first arrangement of conduits, the pre-heater 405 receives the working fluid from the evaporator 404. The pre-heater also receives at least a portion of the exhaust passing from the final expansion turbine 408j. The pre-heater is configured to transfer at least a portion of the heat embedded in the exhaust to the working fluid. The heated working fluid is then passed to the first heater 406a and follows the same onward process through the first arrangement of conduits as described in relation to the CES system of FIG. 7 as described above. The cooled portion of the exhaust may be exhausted into atmosphere through the vent 500 or recycled into another part of the CES system (e.g. liquefaction sub-system, TESD, etc.) or another system (e.g. refrigeration system, air-conditioning system, air liquefier, etc.) co-located to the current CES system.

By pre-heating the working fluid, this system may prevent the heat transfer fluid from freezing as a result of being cooled in the first heater 406a by the working fluid passing from the evaporator 404. For example, after evaporation in the evaporator 404, the working fluid may have a temperature at approximately ambient temperature whereas the temperature of the heat transfer fluid passing from the high-grade TESD 300 and into the first heater 406a, may be approximately 350-400° C. depending on the fluid used. Without the pre-heater 405, some types of heat transfer fluid may freeze, such as some typical molten salts which have a freezing temperature below 190° C. as described above. If these types of molten salts, acting as the heat transfer fluid, fall below 190° C. in the first heater 406a they may be at risk of freezing which will block the second arrangement of conduits. Additionally, when being significantly cooled or approaching its freezing temperature the heat transfer fluid may become more viscous leading to additional work required by the pumps responsible for pumping it through the second arrangement of conduits. The working fluid may be heated from approximately ambient temperature to approximately 50-150° C. before entering the first heater 406a whereas the exhaust passing from the final expansion turbine 408j may be cooled from approximately 210° C. to 125° C. by the outlet to the evaporator 404.

The CES systems described above are considered to be "high energy density" systems. This is because the heat of compression captured during the liquefaction of the process fluid is hotter than traditional CES systems as only high grade heat is captured, therefore the specific work of the liquefaction sub-system 100 is higher. In the power recover sub-system, said captured heat energy can be applied to the working fluid, resulting in higher expansion turbine operating temperatures. Therefore, the power recovery sub-system can extract more energy from the expanding working fluid, meaning the specific work of the power recover sub-system also increases because it produces more energy per unit of working fluid. Therefore, these systems have more energy being discharged and charged. As a result of this, less cryogen is required to produce a MWh of electricity. This means that the cryogenic storage tank and consequently the CES system can be significantly smaller for a given plant energy size (e.g., a 300 MWh plant) on a volume basis. Furthermore, the charging time required to store a given amount of energy may be reduced as well due to the reduced cryogen use.

Additionally, as mentioned above, the disclosed CES systems can efficiently store the heats of compression from the MAC 102 and RAC 114 in a single high-grade TESD 300, which means that a low-grade TESD is not required, which reduces the plant complexity and capital expenditure required to build said plant. Furthermore, the removal of the low-grade TESD avoids the issues associated with them as described above, such as thermal mixing on the stratification boundary of a thermocline based low-grade TESD system, and therefore the associated losses and inefficiency associated with low-grade TESD systems. Also, capturing high-grade heat enables the use of molten salt as a heat transfer fluid or storage medium which is advantageous due to their availability, low costs, non-toxicity, non-flammability, high thermal stabilities and low vapor pressures. The low vapor pressure means the salts are a liquid at atmospheric pressures which results in storage system designs without the need for pressurized tanks.

As noted above the CES system of the present invention may comprise any of the liquefaction sub-system 100 configurations depicted in FIGS. 2 to 6 or described above in combination with any of the power recovery sub-systems 400 configurations depicted in FIG. 7 or 8 or described above. The CES system of the present invention may further be configured to perform any operation from the charging phase simultaneously to any operation from the discharging phase or the whole charging phase process simultaneously to the whole discharging phase process. Furthermore, the heat transfer fluids of the liquefaction sub-system 100 and power recovery sub-systems 400 may be the same fluid and may be passed through a common closed double loop configured to pass the heat transfer fluid between the liquefaction sub-system 100, the high-grade TESD 300 and the power recover sub-system 400. In this case the second arrangement of conduits described in relation to FIGS. 2 to 6 may be fluidly coupled to the second arrangement of conduits of FIG. 7 or 8 to form the closed double loop.

The invention claimed is:

1. A cryogenic energy storage system comprising:
    a liquefaction sub-system comprising:
        a first compressor;
        a first heat exchanger;
        a second compressor;
        a second heat exchanger;
        a third heat exchanger; and
        a first arrangement of conduits, having an upstream end and a downstream end, and configured to pass a process stream from the first compressor through the first heat exchanger, second compressor, second heat exchanger and third heat exchanger;
    a thermal energy storage device configured to store high-grade heat; and
    a second arrangement of conduits forming a closed circuit and configured to pass a heat transfer fluid between the thermal energy storage device, the first heat exchanger and the second heat exchanger;
    wherein the first heat exchanger is positioned along the first arrangement of conduits downstream of the first compressor and configured to transfer at least a portion of high-grade heat of compression of the process stream from the first compressor, via the heat transfer fluid, to the thermal energy storage device;
    wherein the second heat exchanger is positioned along the first arrangement of conduits downstream of the second compressor and configured to transfer at least a portion of high-grade heat of compression of the process stream from the second compressor, via the heat transfer fluid, to the thermal energy storage device; and
    wherein the third heat exchanger is positioned along the first arrangement of conduits downstream of the second heat exchanger and configured to transfer at least a portion of low-grade heat of compression of the process stream from the second heat exchanger to the second compressor, thereby transferring the at least portion of low-grade heat of compression back into the second compressor.

2. The cryogenic energy storage system of claim 1, wherein the liquefaction sub-system further comprises an air purification unit positioned along the first arrangement of conduits downstream of the first heat exchanger, wherein the air purification unit is configured to purify the process stream.

3. The cryogenic energy storage system of claim 2, wherein the liquefaction sub-system further comprises a first air conditioning unit positioned along the first arrangement of conduits between the air purification unit and the first heat exchanger, wherein the first air conditioning unit is configured to substantially or entirely remove the heat of compression of the process stream from the first compressor.

4. The cryogenic energy storage system of claim 2, wherein the liquefaction sub-system further comprises a fourth heat exchanger positioned along the first arrangement of conduits between the first heat exchanger and air purification unit and configured to transfer at least a portion of low-grade heat of compression of the process stream from the first heat exchanger to the process stream downstream of the air purification unit.

5. The cryogenic energy storage system of claim 1, wherein the third heat exchanger being configured to transfer the at least portion of low-grade heat of compression of the process stream from the second heat exchanger to the second compressor comprises transferring the at least portion of low-grade heat of compression of the process stream from the second heat exchanger to the process stream upstream of the second compressor.

6. The cryogenic energy storage system of claim 1, wherein the liquefaction sub-system further comprises: a third arrangement of conduits, having an upstream end configured to be coupled to a cold box and a downstream end, wherein the third arrangement of conduits is configured to pass a return stream from the cold box to supplement the process stream upstream of the second compressor.

7. The cryogenic energy storage system of claim 6, wherein the third heat exchanger being configured to transfer the at least portion of low-grade heat of compression of the process stream from the second heat exchanger to the second compressor comprises transferring the at least portion of low-grade heat of compression of the process stream from the second heat exchanger to the return stream before it supplements the process stream.

8. The cryogenic energy storage system of claim 6, wherein the third heat exchanger being configured to transfer the at least portion of low-grade heat of compression of the process stream from the second heat exchanger to the second compressor comprises transferring the at least portion of low-grade heat of compression of the process stream from the second heat exchanger to the process stream after it is supplemented by the return stream.

9. The cryogenic energy storage system of claim1 , wherein the heat transfer fluid is a first heat transfer fluid, and wherein the cryogenic energy storage system further comprises:
    a power recovery sub-system comprising:
        a pump;
        an evaporator;
        at least one heater;
        an expansion stage corresponding to each of the at least one heater;
        a fourth arrangement of conduits, having an upstream end and a downstream end, and configured to pass a working fluid from the pump through the evaporator and each of the at least one heater and corresponding expansion stage, wherein each heater is positioned upstream of its corresponding expansion stage; and a fifth arrangement of conduits forming a closed circuit and configured to pass a second heat transfer fluid between the thermal energy storage device and each heater of the at least one heater;

wherein each heater is configured to transfer at least a portion of high-grade heat of compression from the thermal energy storage device, via the second heat transfer fluid, to the working fluid; and wherein each expansion stage is configured to expand the working fluid and to extract work therefrom.

10. The cryogenic energy storage system of claim 9, wherein the power recovery sub-system further comprises:

a pre-heater positioned along the fourth arrangement of conduits upstream of the first heater;

wherein the pre-heater is configured to receive at least a portion of the exhaust from the final expansion stage and to transfer at least a portion of the heat from the exhaust of the final expansion stage to the working fluid upstream of the first heater.

11. The cryogenic energy storage system of claim 9, wherein the pump is configured to pump a liquefied product from a cryogenic storage tank and to pressurise it, forming the working fluid.

12. The cryogenic energy storage system of any claim 9, wherein the first and second heat transfer fluids are the same fluid and the second arrangement of conduits and the fifth arrangement of conduits are fluidly connected and share the same heat transfer fluid.

13. The cryogenic energy storage system of claim 9, wherein the first and second heat transfer fluids comprise air, compressed air, water, glycol, a mixture of water and glycol, thermal oil, a mixture of thermal oils or molten salts.

14. A method for heat-of-compression storage in a cryogenic energy storage system, comprising:

providing a liquefaction sub-system comprising a first compressor and a second compressor;

providing a thermal energy storage device configured to store high-grade heat;

compressing a process stream in the first compressor;

capturing at least a portion of high-grade heat of compression of the process stream from the first compressor and storing it, via a heat transfer fluid, in the thermal energy storage device;

compressing the process stream in the second compressor;

capturing at least a portion of high-grade heat of compression of the process stream from the second compressor and storing it, via the heat transfer fluid, in the thermal energy storage device; and capturing at least a portion of low-grade heat of compression of the process stream from the second compressor and transferring it back into the second compressor.

15. The method of claim 14, wherein the method comprises purifying the process stream after the at least portion of high-grade heat of compression of the process stream from the first compressor has been captured.

16. The method of claim 15, wherein the method comprises conditioning the process stream to substantially or entirely remove the heat of compression of the process stream from the first compressor before the process stream is purified.

17. The method of claim 15, wherein the method comprises, after the at least portion of high-grade heat of compression of the process stream from the first compressor has been captured, capturing at least a portion of low-grade heat of compression of the process stream from the first compressor and transferring it to the process stream after it has been purified.

18. The method of claim 14, wherein transferring the at least portion of the low-grade heat of compression of the process stream from the second compressor back into the second compressor comprises transferring the at least a portion of the low-grade heat of compression of the process stream from the second compressor to the process stream before the process stream is compressed in the second compressor.

19. The method of claim 14, wherein the method comprises supplementing the process stream with a return stream before the process stream is compressed in the second compressor.

20. The method of claim 19, wherein transferring the at least portion of low-grade heat of compression of the process stream from the second compressor back into the second compressor comprises transferring the at least portion of low-grade heat of compression of the process stream from the second compressor to the process stream after the process stream has been supplemented by the return stream.

21. The method of claim 19, wherein transferring the at least portion of low-grade heat of compression of the process stream from the second compressor back into the second compressor comprises transferring the at least portion of low-grade heat of compression of the process stream from the second compressor to the return stream before it supplements the process stream.

22. The method of claim 14, wherein the method comprises conditioning the process stream to substantially or entirely remove the heat of compression of the process stream from the second compressor after the at least portion of low-grade heat of compression of the process stream from the second compressor has been captured.

23. The method of claim 14, wherein the method further comprises the steps of:

heating a working fluid with at least a portion of high-grade heat of compression stored in the thermal energy storage device; and expanding the working fluid in an expansion stage and extracting work therefrom.

24. The method of claim 23, wherein the method comprises pre-heating the working fluid with an exhaust stream from the expansion stage before the working fluid is heated.

25. The method of claim 23, further comprising the step of pumping a liquefied product from a cryogenic storage tank and pressurising it to form the working fluid.

* * * * *